United States Patent [19]

Carlson

[11] Patent Number: 4,602,273
[45] Date of Patent: Jul. 22, 1986

[54] INTERPOLATED PROGRESSIVE-SCAN TELEVISION DISPLAY WITH LINE-CRAWL ARTIFACT FILTRATION

[75] Inventor: Curtis R. Carlson, Princeton Township, Mercer County, N.J.

[73] Assignee: RCA Corporation, Princeton, N.J.

[21] Appl. No.: 527,769

[22] Filed: Aug. 30, 1983

[51] Int. Cl.[4] .......................... H04N 7/01; H04N 11/22
[52] U.S. Cl. ........................................ 358/11; 358/1.2; 358/21 R
[58] Field of Search ................. 358/11, 12, 21 R, 160, 358/166, 37, 140

[56] References Cited

U.S. PATENT DOCUMENTS

| | | | |
|---|---|---|---|
| 3,096,398 | 7/1963 | Gabor et al. | 178/6.8 |
| 3,136,847 | 6/1964 | Brown | 178/6.8 |
| 3,400,211 | 9/1968 | Rainger et al. | 178/6.8 |
| 3,457,369 | 7/1969 | Davies et al. | 178/6.8 |
| 4,298,896 | 11/1981 | Heitmann | 360/11 |
| 4,300,162 | 10/1981 | Robers | 358/160 |
| 4,307,421 | 12/1981 | Smit | 358/152 |
| 4,322,750 | 3/1982 | Lord | 358/140 |
| 4,400,719 | 8/1983 | Powers | 358/21 R |

FOREIGN PATENT DOCUMENTS

| | | |
|---|---|---|
| 80304293.6 | 6/1982 | European Pat. Off. |
| 2090505A | 7/1982 | United Kingdom . |
| 2110900A | 6/1983 | United Kingdom . |

OTHER PUBLICATIONS

IBA Report 116/81, Lucas et al, 1981, pp. 1-19, Extended Definition Through Signal Processing.
High Definition Television Studies on Compatible Basis with Present Standards, Wendland, Future Directions for Television, Television Tech. in the 80's, pp. 151-161.

*Primary Examiner*—Michael A. Masinick
*Attorney, Agent, or Firm*—P. J. Rasmussen; Emanuel; R. G. Coalter

[57] ABSTRACT

A television arrangement produces a progressively-scanned display from signals representing an image scanned by a raster having lines of even fields separated vertically by a distance 2S interlaced with the lines of odd fields. For 2:1 interlace, the lines of the odd fields are spatially separated from the adjacent lines of even fields by a distance S. The lines of signal for application to the display are generated by a spatial filter having a response in the vertical direction such that an output signal occurs for each traversal of a distance S. Thus, the number of lines is doubled in each field. The lines are generated in simultaneous pairs. A parallel-to-serial converter (PISO) converts the simultaneous signals to sequential for display by progressive scanning. The PISO may be a time compressor for use with a double-rate display or a switcher for use with a vertically-dithered display. The characteristics of the filters are selected to match the psychovisual properties of the eye for eliminating line crawl, and for reducing edge flicker and motion artifacts without excessive image degradation. Advantage is taken of the psychovisual phenomenon known as adjacent band masking.

27 Claims, 58 Drawing Figures

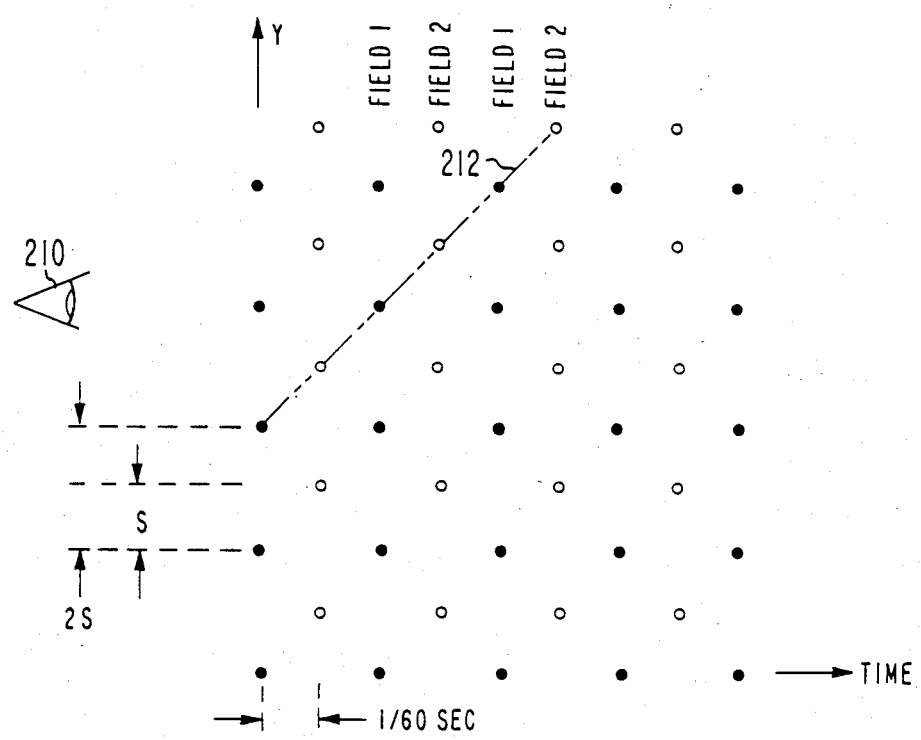
Fig. 2
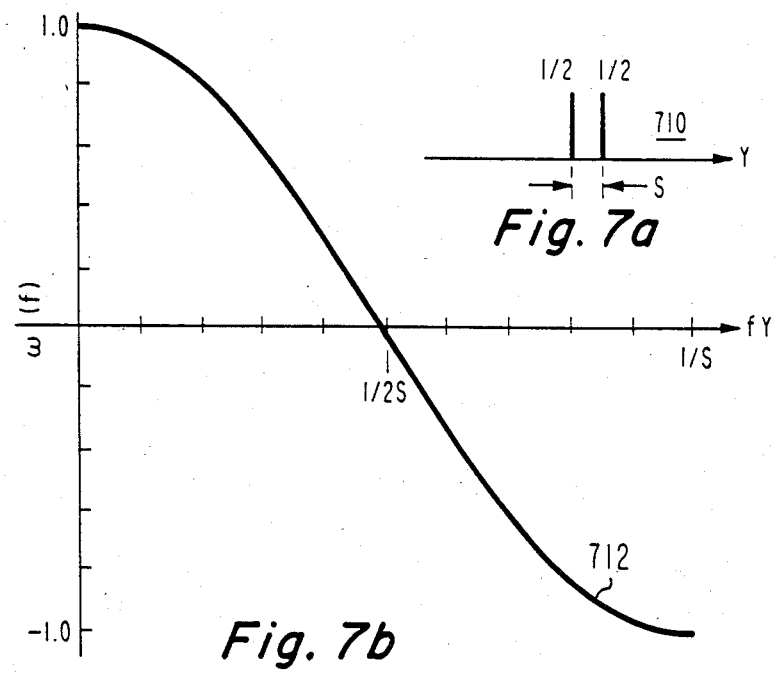
Fig. 7a
Fig. 7b

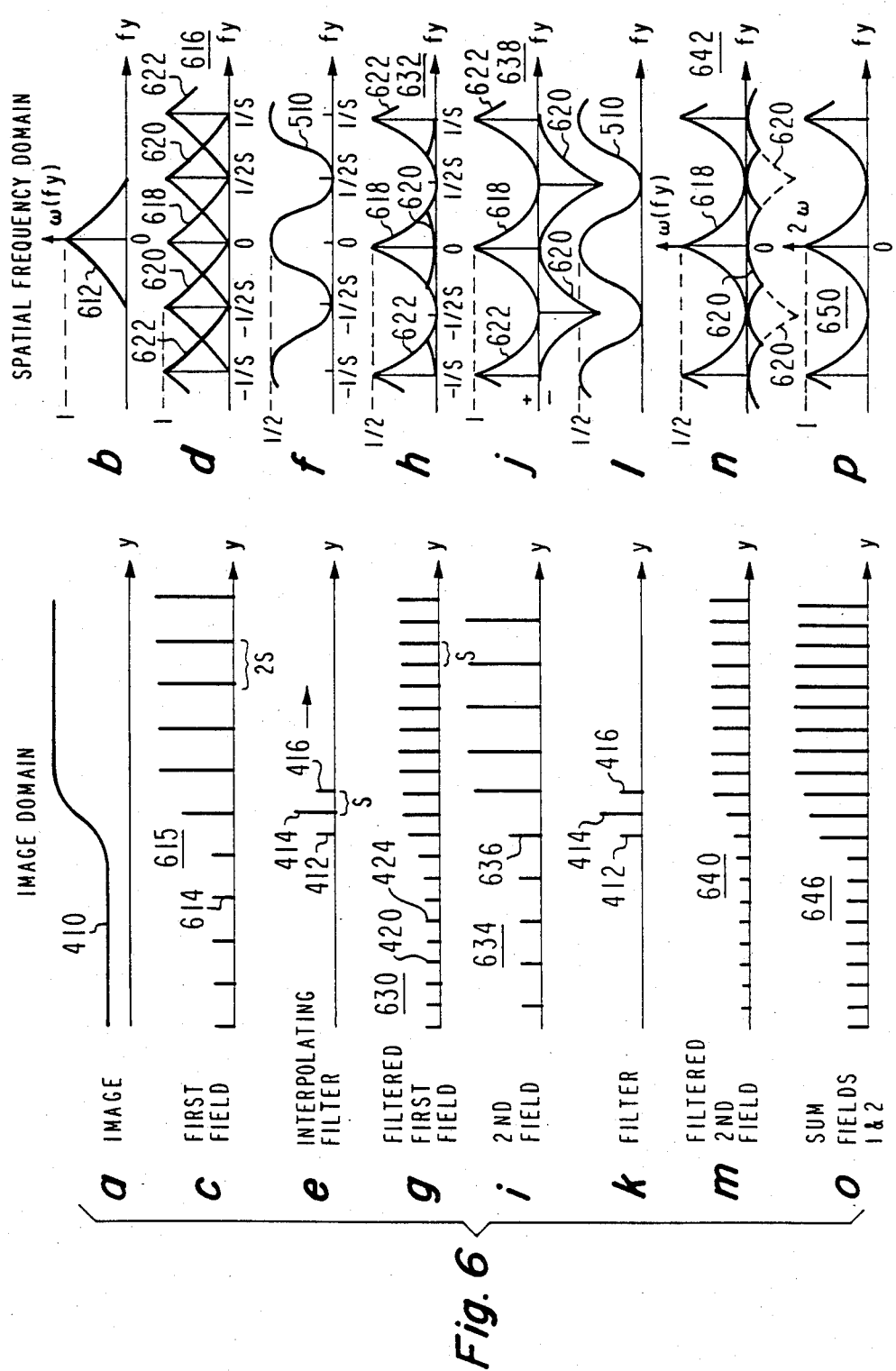

INTERPOLATED PROGRESSIVE-SCAN TELEVISION DISPLAY WITH LINE-CRAWL ARTIFACT FILTRATION

BACKGROUND OF THE INVENTION

This invention relates to reduction of the visibility of line-crawl artifacts in a progressively-scanned television display generated from a field-rate interlaced signal.

Attention has recently been directed to high-definition television (HDTV) systems, in which the displayed picture has great horizontal and/or vertical resolution for improved appearance on large-screen and projection-type displays. Because such systems may undesirably not be compatible with current color television standards, consideration has been given to improving the appearance of the display of conventional standard-definition television, such as NTSC or PAL, to produce an "enhanced-NTSC(-PAL)" system, requiring no basic change to current broadcast standards. Among the schemes proposed for enhanced-NTSC(-PAL) is a change in the receiver from interlaced display to progressively-scanned display. In the case of NTSC this involves starting with an incoming television signal representing 262½ raster scan lines, occurring in a field interval of 1/60 second, followed by a second set of 262½ raster scan lines interlaced with the first set, the second set also having 1/60 second elapsed time to form a "monochrome" frame of 525 lines in 1/30 second. The term "monochrome" refers to the fact that the 1/30 second frame does not include a complete repetition cycle of the phase of the color subcarrier relative to horizontal sync; an interval with a complete subcarrier phase repetition is termed a "color" frame and requires two monochrome frame intervals (1/15 sec) for 60 Hz, 525-line NTSC and four frame intervals (1/6.25 second) for 50 Hz, 625-line PAL.

To form a progressively-scanned display from a signal representing an interlaced scan-line raster, additional raster scan lines must be provided during each field. The signals representing each field can be delayed for a field interval and displayed in proper sequence with the lines of video of the next following field. In effect, the line of the preceeding field is actually inserted between lines of the current field. This scheme has the advantage of reducing flicker, motion-related artifacts, and line-crawl artifacts, but has the disadvantage of requiring a field store for storing each of the lines of a field for one field interval. Such field stores are expensive and consume substantial power.

One way of increasing the number of lines in a television field is to simply replicate each horizontal line, as described in U.S. patent application Ser. No. 359,612 in the name of R. A. Dischert (U.S. Pat. No. 4,415,931), which method requires line storage and simple electronics.

It is also known to use line-stores for delaying each line of incoming signal for a duration sufficient to perform an interpolation to generate signals representing raster lines interpolated between the raster lines of the current field. This is most simply accomplished by averaging the signals of two adjacent lines of a field to form by linear interpolation a signal representing an estimate of the signal representing the interlaced line of a temporally adjacent field. These estimated signals are simply inserted between unaltered lines of the current field. It is also known to use quadratic interpolation using more than one-line store, all as described in U.S. patent application Ser. No. 300,227, filed Sept. 8, 1981 in the name of K. H. Powers (now U.S. Pat. No. 4,400,719. When an interpolation scheme is used to estimate alternate lines to be displayed so that a double-rate progressively-scanned display may be operated from a source of interlaced video signals the term "pseudo-progressive" scanning may be used. Pseudo-progressive scanning eliminates line-crawl artifacts and reduces motion-related artifacts and flicker. It can also result in the loss of vertical spatial detail.

FIG. 1a illustrates in perspective view an interlaced raster having 525 scanning lines, only a few of which are shown for improved clarity. Scanning of the raster begins at the top left edge of the raster with line 1 which scans to a point 11 during one line interval and retraces to point 2 to begin a second scan which ends at point 12. The scanning continues with a succession of 262 scan lines of the first field. As illustrated, scan line 262 ends at point 14 at the right of the raster. The first field ends with the scanning of a half-line of line 263. Scanning of the second field begins with scanning of the second half of line 263, which ends at point 15. The scan retraces to the left and scans lines 264–525, which are interlaced or scanned between the lines of the first field. Scan line 525 ends at point 16. Scanning then begins again with line 1 in a recurrent manner.

FIG. 1b illustrates the recurrent scanning of FIG. 1a expanded to include the time dimension. As illustrated in FIG. 1a, the first field is scanned by 262½ lines at a time T0. At a time T2 which is 1/60 second (FOR NTSC) later than T1, the last half of line 263 is scanned and ends at point 15. The second interlaced field is completed by scanning lines 264–525. Scanning begins again at a time T3 which is 1/30 second later than time T1, with a scan corresponding to that of field one (1). This sequence recurs continuously, so that the field pattern illustrated in FIG. 1b continues indefinitely to the right.

FIG. 2 is a space-time representation of the raster lines of FIG. 1. FIG. 2 may be interpreted as a view along the x-axis of the representation of FIG. 1b. In FIG. 2, the scan lines are seen end-on and are represented by dots. The scan lines of the odd fields are illustrated by solid dots and the scan lines of even fields by open dots, as in FIG. 1. The time between successive fields is shown as 1/60 second, but could also be 1/50 second or any other interval. The vertical (Y-direction) spacing between a scan line and the adjacent scan line of the following field as illustrated is S, and 2S is the vertical distance between the location of a scan line of one field and the adjacent scan lines of the same field when the adjacent scan line of the next field is half-way between the scan lines of the current field.

FIG. 3a represents a Fourier transform designated generally as 300 of the vertical-direction, space-time representation of FIG. 2. The abcissa is measured in terms of inverse time or temporal frequency (ft), and the ordinate in terms of inverse distance or spatial frequency (fy). Spatial frequency is measured in cycles per picture height (cph) which for a particular screen size viewed at a particular distance translates into cycles per degree of subtended angle (cycles/degree) as described in the article *Modeling the Human Visual System* by Adelson, et al., published in Volumn 27, No. 6 of RCA Engineer, Nov./Dec. 1982. The desired signal in the vertical direction at any given time (i.e., with time a constant) is sampled by the raster scan lines with spacing 2S as illustrated in FIG. 2. Consequently, in accord with the Nyquist criteria the signal component at $f_t=0$ Hz in FIG. 3a can extend only as far in the vertical direction as $fy=\pm\frac{1}{2}S$. Those portions of the signal at spatial frequencies centered about multiples of $\pm\frac{1}{2}S$ are repeat spectral information resulting from sampling at 2S. These terms represent visible, undesirable artifacts in the image. For example, at 0 Hz (i.e., for a constant picture) the raster line structure is represented as an artifact at $\pm 1/S$. Another artifact can be understood by imagining a non-scanned white image field which flashes on and off every 1/60 second. This artifact is represented by points on the transform of FIG. 3a at $f_t=\pm 60$ Hz along the frequency axis, $fy=0$. This artifact is known as large area flicker. There is another discrete artifact, which has both spatial frequency and temporal frequency components, and it is located at the points $f_t=\pm 30$ Hz, $fy=\pm\frac{1}{2}S$. This artifact is known as line crawl, and arises due to the interlace of the lines of successive fields. Physically, this may be understood by considering what happens if an eye 210, located as illustrated in FIG. 2, scans the display in a vertical direction. At certain eye scan rates, the successively arriving raster scan lines will be perceived as moving vertically. The line crawl results from psychovisual perception of the lines as moving in space as a function of time, and results from the eye following a space-time path such as is illustrated by chain line 212.

The pattern of FIG. 3a represents the transform of components as they would appear for a white raster scanned interlaced at 60 Hz, as suggested by raster 340 of FIG. 3b. The spectrum of a raster having a black-to-white transition is illustrated as 350 in FIG. 3c. The transition (illustrated in FIG. 3d) causes sidebands or spectral components to extend in the $f_y$ direction, as illustrated by dotted lines 356. These vertical components represent line or edge flicker. If the edge or transition between block region 352 and white region 354 of the raster of FIG. 3d moves, the motion causes spreading of lines 356 to fill with general motion artifacts those quadrangles of spectrum 350 in which the edge flicker components reside. For ease of understanding, the components of FIG. 3c are represented in a perspective view in FIG. 3e, with the amplitude axis illustrated at right angles to the $f_y$ and $f_t$ axes.

FIGS. 4a–h are illustrations aiding in understanding the notation used for interpolating filters. In FIGS. 4a–h, the abscissa represents the vertical direction measured in raster lines. An arbitrary image-representative signal 410 is shown having a value of 1.0 units in the range from 1 to 3 raster lines and a value of 2.0 units in the range from 6 to 8 raster lines and beyond, with a smooth transition in between. The signal only exists at the raster line points, as indicated by the dots. This signal may be imagined as a raster which is black (low signal level) at the top (raster lines 1–3) and white (high signal level) at the bottom (raster lines 6–8) with a transition in the region of raster lines 3–6. FIGS. 4b–4g represent some of the successive positions assumed by the response of a 3-tap interpolating filter (i.e., linear interpolation) which is convolved with or which scans the signal in time, and therefore in effect scans in vertical space. The filter response includes three peaks 412, 414 and 416 separated from one another by spatial distance S, equal to half a scan line separation. Peak 414 has a "multiplier" or "value" of $\frac{1}{2}$ or 0.5, while "peaks" 412 and 414 each have a value of $\frac{1}{4}$ or 0.25. The values of the multipliers of the various peaks in the spatial-frequency response of the filter are selected or normalized to form a sum value equal to unity, so that the intensity of the picture is the same before or after interpolation of lines, otherwise doubling the number of lines would double the brightness. As the filter receives the image-representative signal 410, the filter response effectively scans in space. At the instant illustrated in FIG. 4b, filter response peak 414 having a value of 0.5 coincides with raster line 1, while peaks 412 and 416 do not coincide with a raster line. The value of the signal produced by the filter at any moment of the scan is established by multiplying the value of the signal intercepted at that moment by each filter peak by the multiplier associated with that peak or tap, and then summing those weighted values. For the filter position represented by FIG. 4b response peak 414 intercepts a signal having a value of 1.0 and response peaks 412, 416 intercept zero signal. The value of the filter output signal in the position illustrated in FIG. 4b is:

$$(0.25\times 0)+(0.5\times 1.0)+(0.25\times 0)=0.5.$$

The above value produced by the filter is plotted as 420 as illustrated in FIG. 4h. The filter continues to scan, assuming the position illustrated in FIG. 4c one-half raster scan later. In this position, filter response peak 414 does not intercept any signal, while response peaks 412 and 416 each intercept signal having a value of 1.0 at raster scan lines 1 and 2, respectively. The value of the filter output is computed $$(0.25\times 1.0)+(0.5\times 0)+(0.25\times 1)=0.5$$

which is plotted as 422 in FIG. 4h. The filter continues to scan, successively taking on vertical positions, some of which are illustrated in FIGS. 4d–g. An output signal is produced twice during each traversal of a distance 2S. One such output signal occurs when the central response peak 414 intercepts the signal value at a raster scan-line, and the other occurs when peak 414 is halfway between raster scan lines, at which time response peaks 412 and 416 intercept the adjacent raster lines. When filter response peak 414 intercepts signal, the output signal is proportional to the actual intercepted signal. When filter response peaks 412 and 416 intercept signal, the filter output signal is proportional to the average of the two signals intercepted. In FIG. 4, the value of the product of each illustrated response peak times the intercepted image 410 is noted below the response peak. The filter output signal represents actual raster lines interspersed with raster lines interpolated by averaging. Other filter responses can be represented in the same fashion, by a succession of spaced response peaks, and the output of the filter is established as the sum of the various instantaneous products of the response peak value multiplied by the intercepted signal value.

SUMMARY OF THE INVENTION

An interpolator for receiving line-scan signals representing a field-to-field interlaced raster-scanned image for generating a pair of lines from each line of input signal uses a filter having a spatial response including two outputs for each traversal of a vertical distance equal to the distance between two incoming lines. The filter response in the spatial-frequency domain remains positive and is peaked for certain spatial frequencies for eliminating line crawl and for reducing line flicker and motion artifacts without excessive degradation of the image.

DESCRIPTION OF THE DRAWING

FIG. 2 illustrates interlaced raster scanning in space-time diagram form;

FIGS. 5a, 5b, 5c, 7a–b, 8a–b, 9a–b, and 10a–b illustrate various filter responses and their characteristics;

FIGS. 6a–6p illustrate various functions and filters in the image domain and their spatial frequency domain transforms;

DESCRIPTION OF THE INVENTION

Figure 5A:
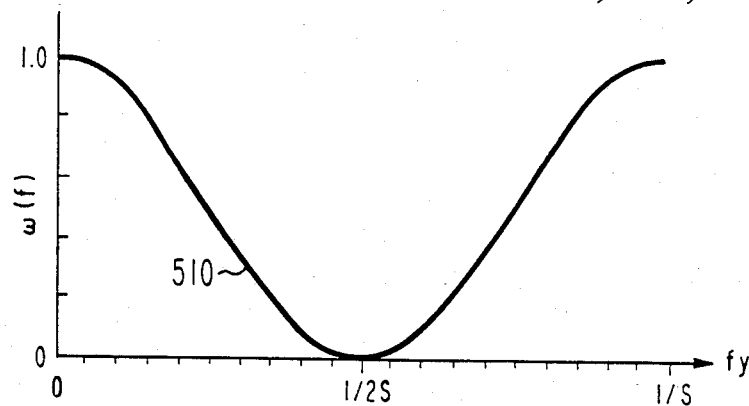
Figure 5B:
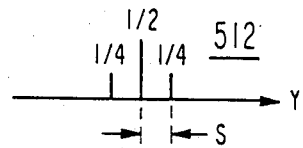
Figure 5C:
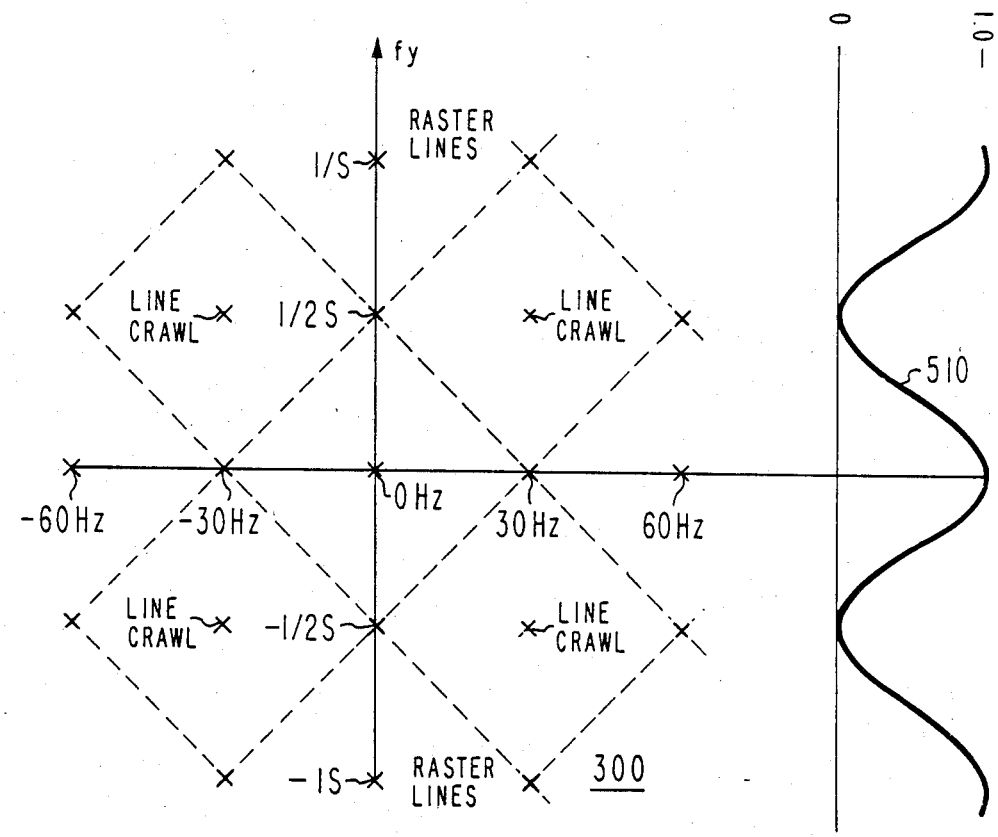

FIG. 5a illustrates an amplitude vs. spatial-frequency plot 510 of the response of the three-tap filter of FIG. 2 repeated in FIG. 5b. Plot 510 is a Fourier transform of the amplitude-versus-vertical-distance response illustrated in FIG. 5b. This is readily understood when considering that the Fourier transform of an impulse pair separated by a distance 2S is a cosinusoid pattern, and that the addition to the impulse pair of a third impulse centered therebetween, offsets the transform cosinusoid by the amplitude of the third impulse, as detailed at page 33 in the text *The Fast Fourier Transform* by E. Oran Brigham (Prentice Hall, 1974). Thus, plot 510 is a half-amplitude cosinusoid offset in amplitude by 0.5. The amplitude of response plot 510 is zero at a spatial frequency (fy) equal to ½S. FIG. 5c illustrates filter vertical-spatial-frequency plot 510 adjacent Fourier transform plot 300 of FIG. 3. The peaks (amplitude equal to 1.0) of response 510 as illustrated occur at fy=0, 1/S although peaks (not shown) in the response occur at ±1/S, ±2/S, ±3/S . . . while the nulls (amplitude equals zero) occur at those vertical spatial frequencies half way between, in particular at those frequencies at which the line-crawl artifacts are centered, namely ±¼S. The peaks of response 510 at fy=0 provide peak response for the lower spatial frequencies at all temporal frequencies, has half-amplitude response at fy=¼S, and zero response at the ½S spatial frequencies at which line crawl components are centered. Thus, desirable signal occuring at spatial frequencies near ¼S are attenuated by about 6 dB, and therefore the vertical detail is undesirably reduced by this filter.

Spatial-frequency plot 510 of FIG. 5a is illustrated only over the region of $f_y=0$ to fy=1/S. It should be understood that the spatial-frequency plot actually extends to ±00 and the response repeats periodically, one period being shown. Consequently, the response peaks actually occur at ±2N/2S, where N=0, 1, 2 . . . and the nulls occur between the peaks. When discussing filter responses in the spatial-frequency domain, it may be convenient to illustrate and discuss only one or a few periods, which those skilled in the art will readily understand to be applicable to the entire spectrum.

FIGS. 6a–p illustrates the principle by which the line-crawl frequency components tend to be cancelled by a suitable interpolating filter. FIG. 6a illustrates as 410 a general signal representative of an image from a camera having amplitude as a function of vertical distance, and FIG. 6B illustrates the Fourier transform 612 of signal 410 as amplitude W(fy) vs spatial frequency. As might be expected, there are few high spatial frequencies in spectrum plot 612, because of the smooth transition exemplified in signal 410.

FIG. 6C illustrates the amplitude-versus-spatial distance plot of signal 410 sampled by the raster scans of a first television field. The sampled plot consists of a number of recurring impulses 614 at 2S intervals, and having amplitudes derived from the signal amplitude. FIG. 6d represents a spatial-frequency spectrum 616 of the signal of FIG. 6C. Spectral distribution 616 includes peaks at ½S spatial-frequency intervals resulting from the sampling at 2S spatial intervals. A spectral peak 618 corresponds to peak 612 of the signal, and repeat spectra 620, 622 occur at ±½S, ±1/S . . . Note that repeat spectra 622 do not overlap spectrum distribution 618, while spectra 620 overlap both 618 and 622. FIG. 6e illustrates the response of the three-tap filter of FIGS. 4 and 5, which scans in the direction of the arrow to intercept portions of signal 615. FIG. 6f illustrates the Fourier transform of the filter response, corresponding to the raised cosinusoid of FIG. 5. FIG. 6g illustrates the output signal 630 from the filter which results from scanning the response 412–416 across signal 615, as described in conjunction with FIG. 4. FIG. 6h illustrates the transform 632 of signal 630. Transform 632 includes spectral peaks at 0, ±1/S which can be viewed as arising from sampling the image signal 410 at spatial intervals of S as illustrated by signal 630. Alternatively, transform 632 may be viewed as the multiplication of the spectral distribution 616 by the filter transfer function 510. It will be noted that the peaks in the amplitude of distribution 510 correspond with the peaks of spectral peaks 618 and 622, so the peak values remain the same in spectrum 632. However, the nulls in filter response 510 at ±½S correspond to the peaks 620, so these peaks are suppressed essentially to zero. In the regions about $\pm\frac{1}{2}S$ the filter function 510 is small but non-zero, so a small component of the information relating to peaks 620 continues to exist in spectrum 632. The unwanted residue of spectral peaks 620 principally occupies the higher-spectral-frequency portions of spectral peak 618, i.e., those portions closer to $fy=\pm\frac{1}{2}S$ rather than to $fy=0$.

FIG. 6i illustrates the signal 634 resulting from sampling image signal 410 by a second field interlaced with the first. Sampling points 636 are separated by distance S and have amplitudes related to the magnitude of image signal 410, as in the case of FIG. 6g. However, the sampling points of FIG. 6i are offset from the sampling points of FIG. 6c by a vertical distance S. FIG. 6j illustrates the transform of distribution 634. Because of the offset in sampling points, the Fourier transform 638 has the spectral peaks 620 inverted in amplitude relative to peaks 618 and 622 centered about the frequencies of 0, and $\pm\frac{1}{2}S$. FIGS. 6k and 6l are repeats of FIGS. 6e and f for the reader's convenience. FIG. 6m represents the output 640 of the interpolating filter with response 412–416 acting on signal 634, and spectrum 642 of FIG. 6n represents the Fourier transform of signal 634. Spectrum 642 can be considered to be the multiplicative product of distribution 638 of FIG. 6j and response 510 of FIG. 6l. As before, peaks 618 and 622 at the frequencies 0 and $\pm 1/S$, etc., remain substantially unaffected, but peaks 620 at the frequencies $\pm\frac{1}{2}S$, $\pm 3/S$ (not shown) are attenuated. Signal 646 and distribution 650 of FIGS. 6o and 6p, respectively, represent the sums of signals 630 and 640 and distributions 632 and 642, respectively. As can be seen, the amplitude of signal 646 is increased. The amplitude of the peaks 618 and 622 of the spectral distribution are also increased (the scale factor in the $W_{(fy)}$ direction has been changed from W to 2W to keep the size within the available space) but the positive and negative residues of attenuated peak 620 cancel. This cancellation also results in the elimination of the line crawl artifacts because the filter response goes to zero along $fy=\pm\frac{1}{2}S$.

The cancellation of the line crawl artifact eliminates its visibility in large uniformly-illuminated areas of the display. Line flicker, however, is not completely removed, nor are the more general motion artifacts completely removed. To the extent that the line-flicker artifacts are removed, vertical detail is also removed from the image.

Figure 1B:
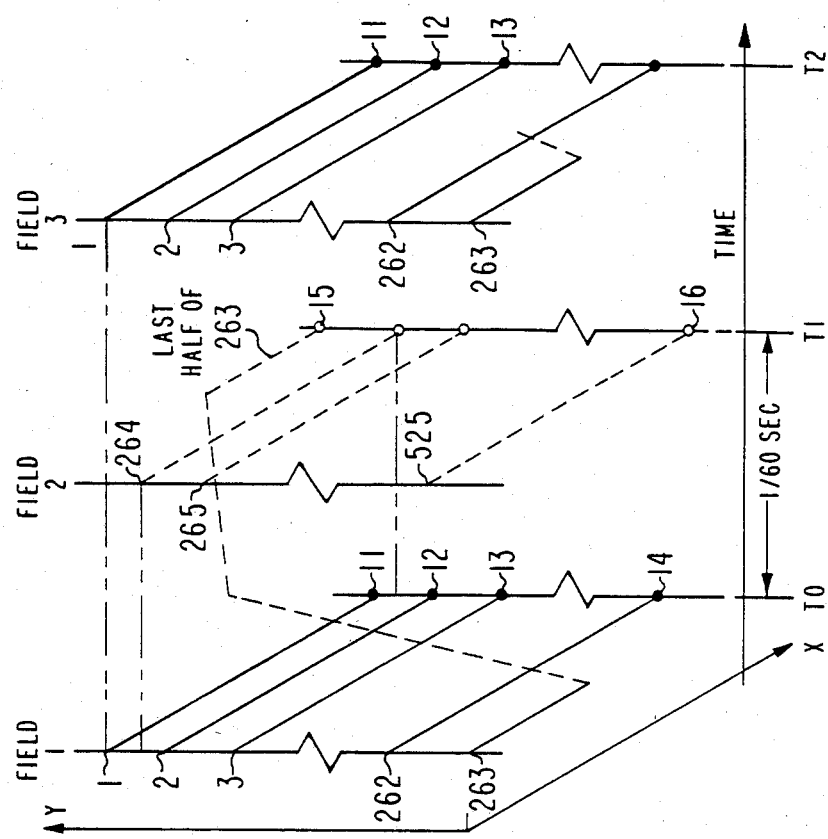
FIGS. 1a–b illustrates in perspective view successive television raster scans as an aid to understanding FIG. 2.
Figure 1A:
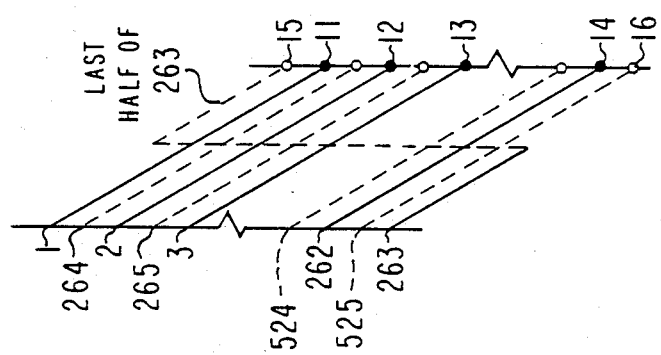
Figure 3A:
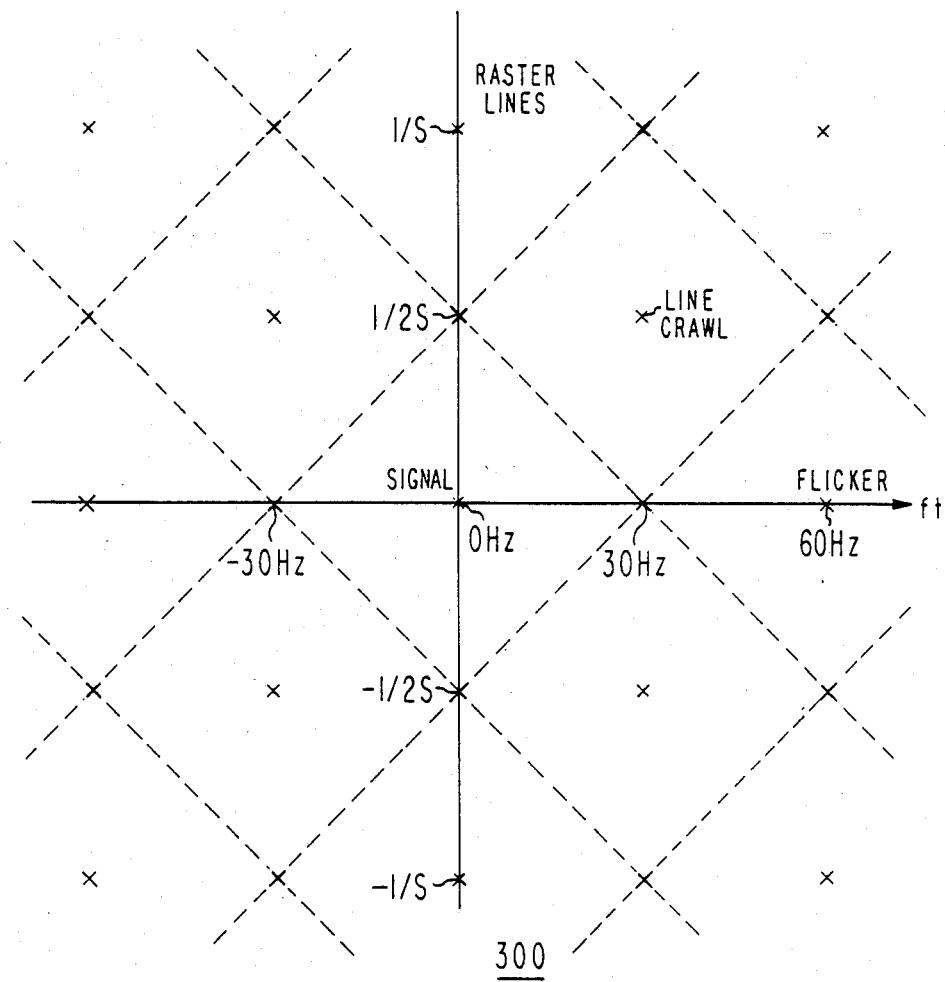
FIGS. 3a–3e illustrate Fourier transforms of the distribution of FIG. 2 for rasters having various information contents.
Figure 3B:
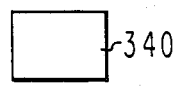
Figure 3C:
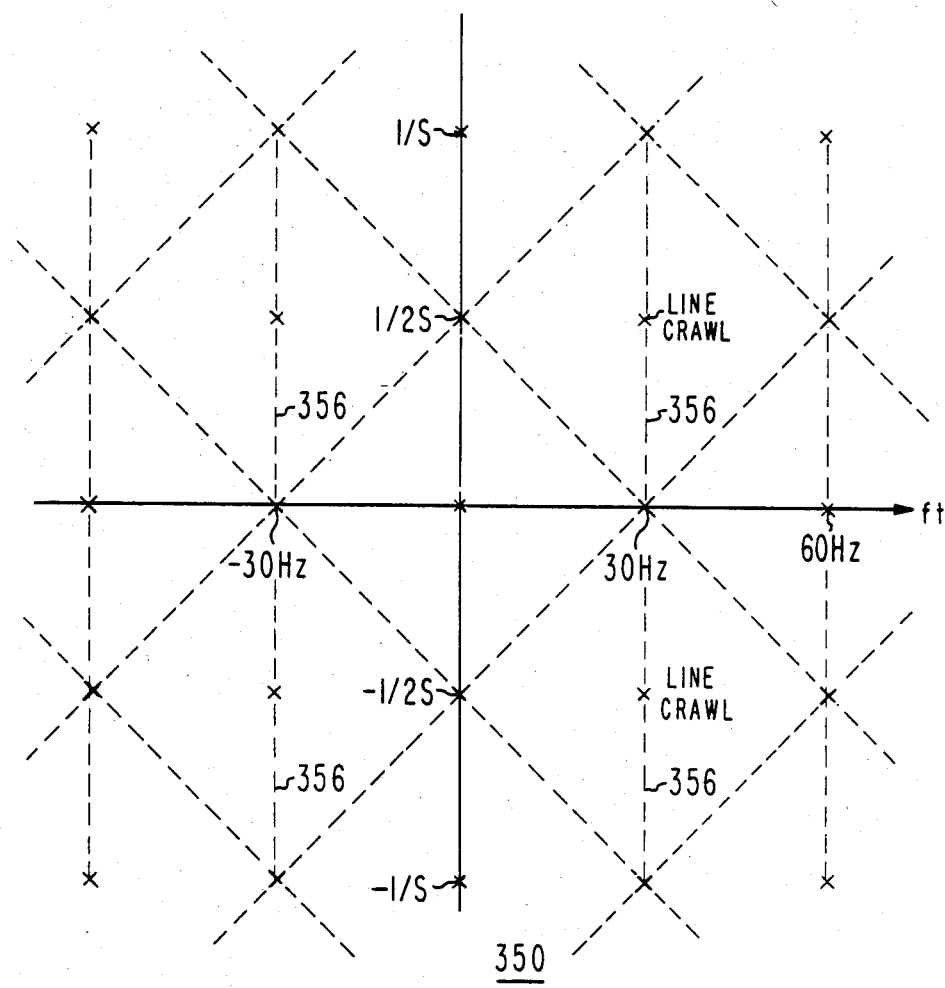
Figure 3D:
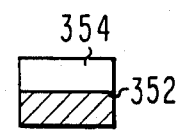
Figure 3E:
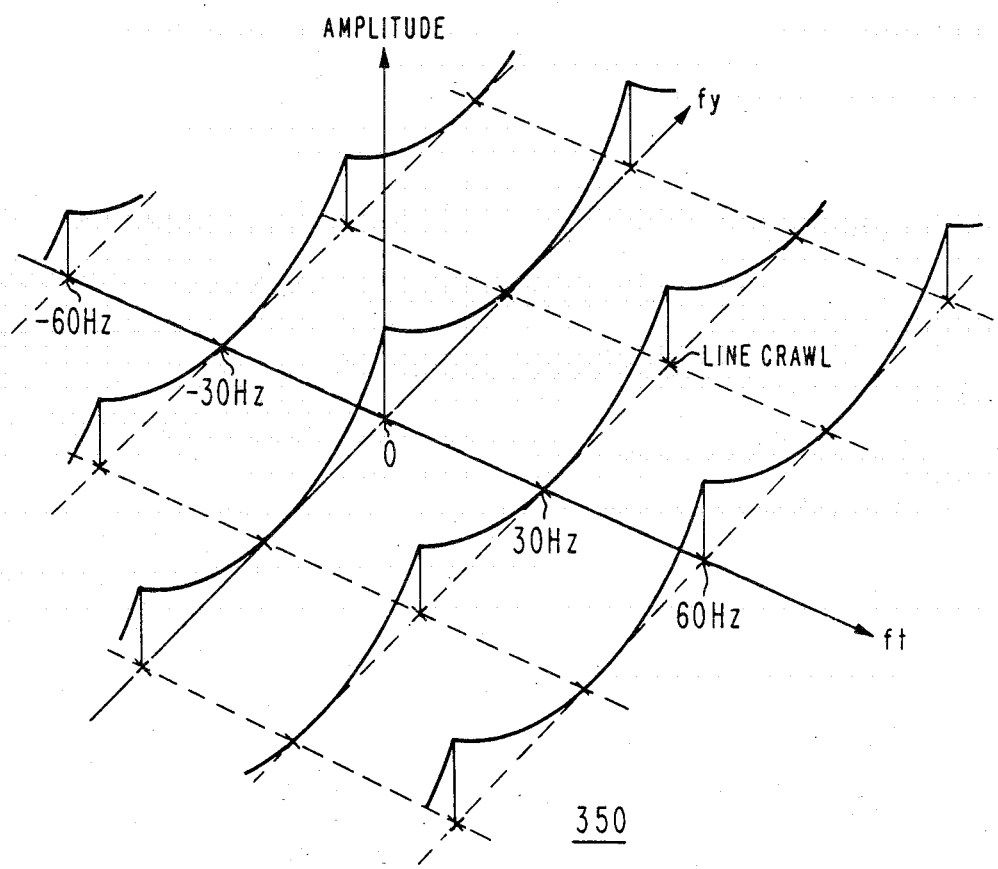
Figure 4:
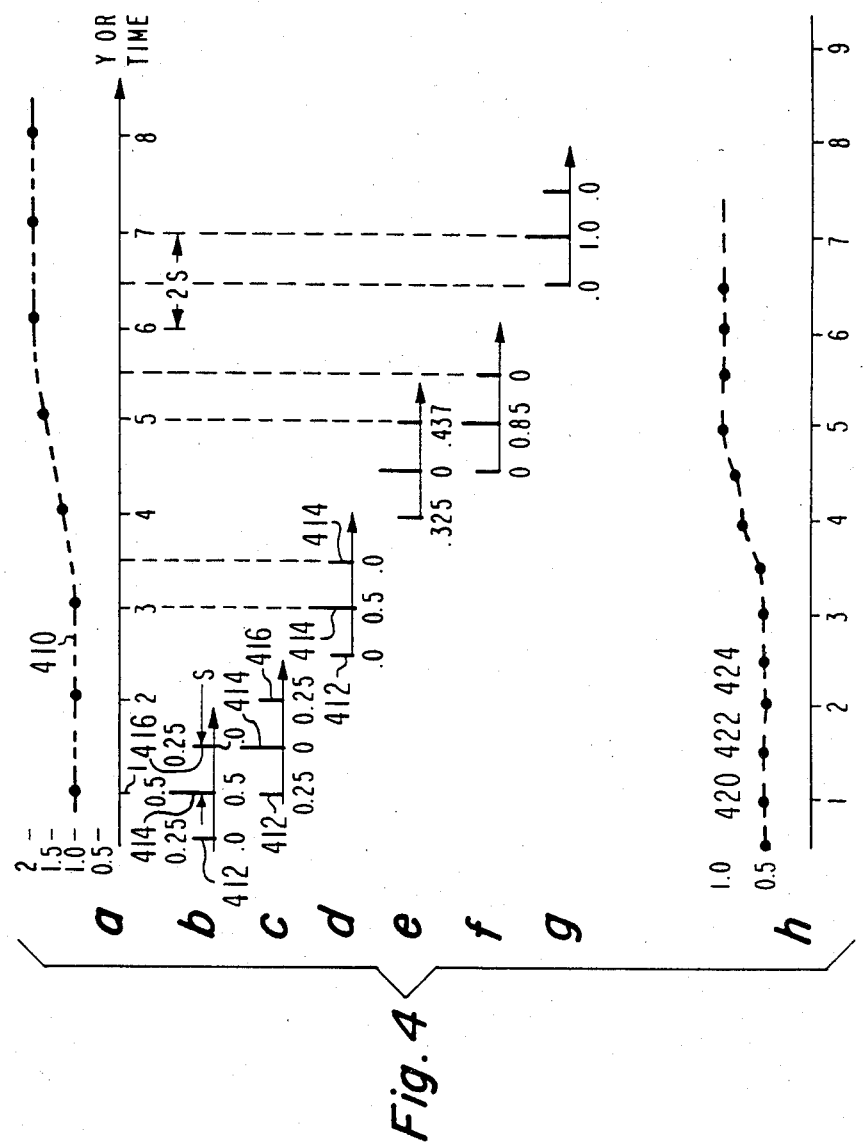
FIGS. 4a–h illustrate a video parameter, such as amplitude, as a function of time or vertical position on the raster, together with a representation of an interpolation filter at various times and the resulting interpolated waveform, all as an aid to understanding the notation and representation of such filters.

As mentioned, the 3-tap filter response 512 of FIGS. 4 and 5 represents interpolation by averaging adjacent lines. FIG. 7a illustrates the spatial response 710 of a two-tap filter with tap weights of $\frac{1}{2}$, $\frac{1}{2}$ separated by $\frac{1}{2}S$. Such a filter is equivalent to simply repeating each raster scan line. FIG. 7b illustrates the Fourier transform 712 of response 710. The response is a simple cosinusoid without an amplitude offset. Because of the lack of an offset, cosinusoid 712 has a phase inversion from positive to negative at $fy=\frac{1}{2}S$. The response goes to zero at $\frac{1}{2}S$, and therefore the line crawl is eliminated, as in the case of the 3-tap filter of FIG. 5, and the filter has fairly good low-frequency response. The loss of high-frequency signal in the region between $fy=\frac{1}{4}S$ and $\frac{1}{2}S$ is somewhat less than that of the 3-tap filter, but the attenuation of motion artifacts is also less (its response near $fy=\frac{1}{2}S$ is greater). Thus the 2-tap line-repeating filter results in a display with slightly better sharpness but with slightly more motion artifacts when compared to the 3-tap averaging filter. It should be noted that amplitude response 712 has a positive portion from $fy=0$ to $\frac{1}{4}S$, and a negative portion between $\frac{1}{4}S$ and $1/S$. The negative portion of the response is undesirable, for it effectively represents a vertical-direction displacement of the portion of the repeat signals affected. Thus, for a display generated using the filter response of FIG. 7, the positions of high-spatial-frequency sample-related artifacts will be displaced.

Figure 8A:
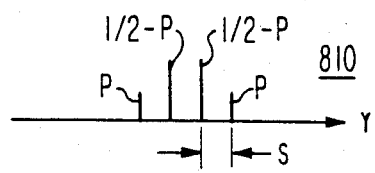
Figure 8B:
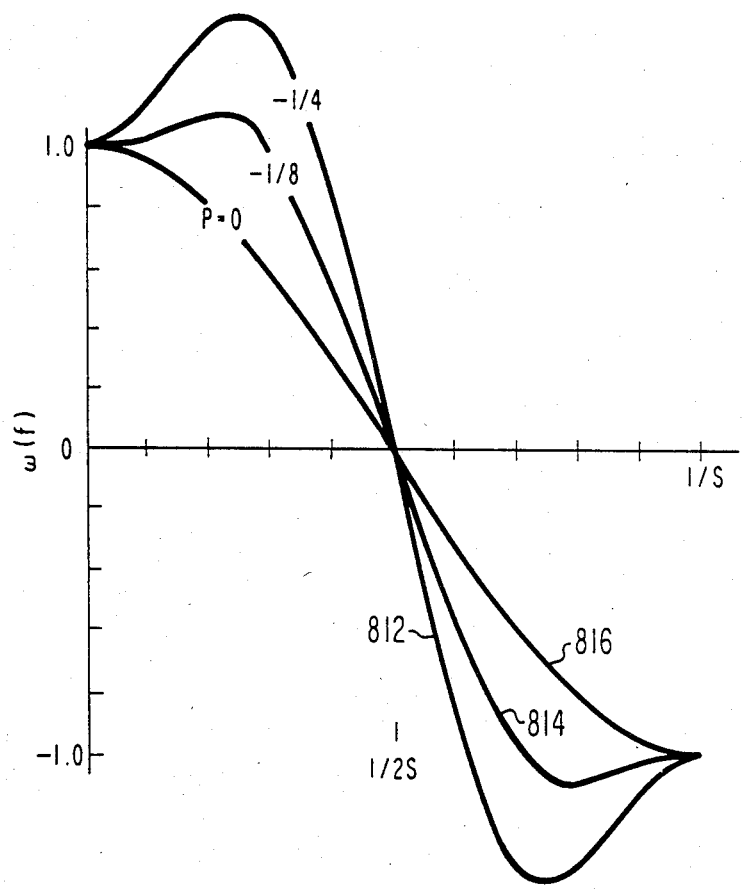

FIG. 8a illustrates another filter response 810 having four taps separated by vertical distance S. The values of the taps are defined in terms of a parameter p and have values p, $\frac{1}{2}$-p, $\frac{1}{2}$-p, p. Parameter p can be selected to be zero, in which case the Fourier transform of the response is the amplitude-versus-spatial frequency plot 812 of FIG. 8b, which corresponds to response 712 of a two-tap filter. A value of p of $-\frac{1}{8}$ yields plot 814 and $p=-\frac{1}{4}$ yields plot 816. It can be seen that values of p more negative than zero result in a degree of peaking of the response at spatial frequencies above zero and below $\frac{1}{2}S$, i.e. in the image portion of the spatial-frequency spectrum. This improves the apparent vertical resolution of the display. The line-crawl artifacts at $fy=\frac{1}{2}S$ are attenuated since responses 812–816 are all zero at that spatial frequency. This filter undesirably has a negative phase response in the region between $\frac{1}{2}S$ and $1/S$, representing artifacts which as mentioned causes displacement distortion within that range of spatial frequencies.

Figure 9A:
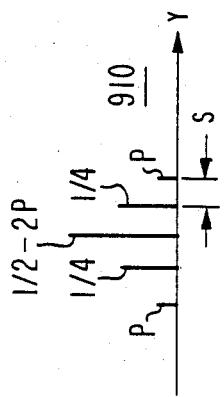
Figure 9B:
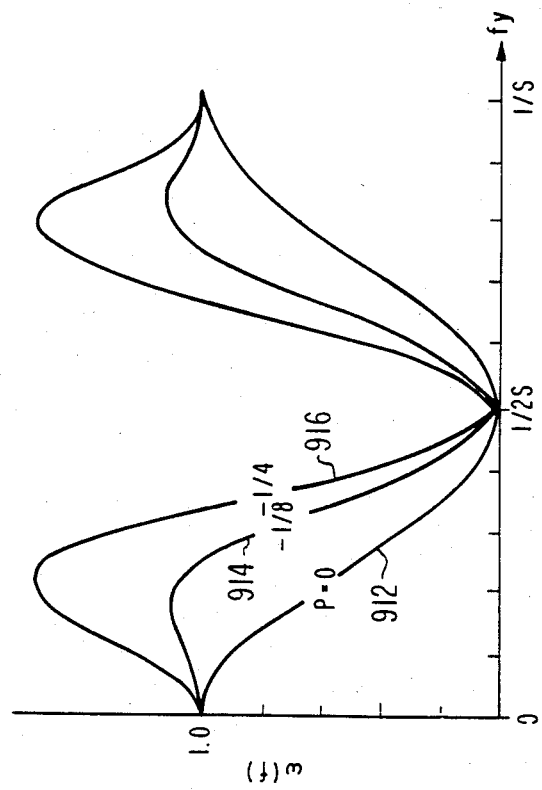

A five-tap filter response 910 is illustrated in FIG. 9a, the taps of which are separated by S and which have weights or values p, $\frac{1}{4}$, $\frac{1}{2}-2p$, $\frac{1}{4}$, p. Plots 912, 914 and 916 of FIG. 9b illustrate the Fourier transform of the filter response for $p=0$, $-\frac{1}{8}$, $-\frac{1}{4}$, respectively. Plot 912 for $p=0$ corresponds to plot 510 for a 3-tap filter. All the plots go to zero at $\frac{1}{2}S$ and therefore remove the line-crawl artifact. For values of p more negative than zero, the plot is peaked in the region between $fy=0$ and $fy=\frac{1}{2}S$ so that the signal response at those spatial frequencies is greater than the response at $fy=0$. There is no inversion of phase in the region between $\frac{1}{2}S$ and $1/S$. This filter has performance superior to that of the two-tap filter of FIG. 7 because the attenuation near $fy=\pm\frac{1}{2}S$ is greater as may be understood by noting that the slope of the response is zero near $\frac{1}{2}S$. The signal is peaked between zero and $\frac{1}{2}S$, and there is no phase inversion from $\frac{1}{2}S$ to $1/S$.

Figure 10A:
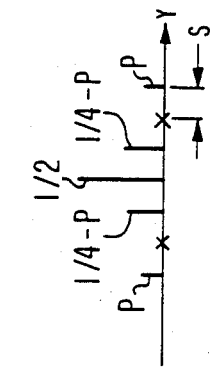
Figure 10B:
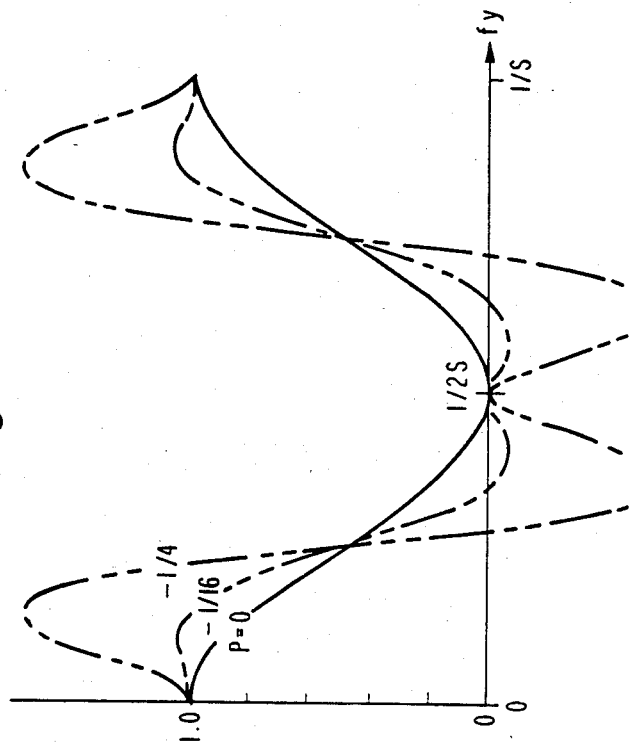

A quadratic interpolation filter with seven taps corresponding generally to that of Powers has its response illustrated in FIG. 10a. The seven taps have weights p, zero, $\frac{1}{4}-p$, $\frac{1}{2}$, $\frac{1}{4}-p$, zero, p, and are separated by S. The transform of the filter response is illustrated in FIG. 10b for $p=0$, $-1/16$ and $-\frac{1}{4}$. For $p=0$, the filter degenerates to a 3-tap averaging filter. This filter has a positive-phase signal peak in the region from $fy=0$ to about $fy=\pm\frac{1}{4}S$ and a negative-phase peak in the region from $fy=\pm\frac{1}{4}S$ to $\pm\frac{1}{2}S$. Thus, for the purpose of preserving image sharpness while attenuating the motion artifacts this filter may not be optimum.

Figure 11A:
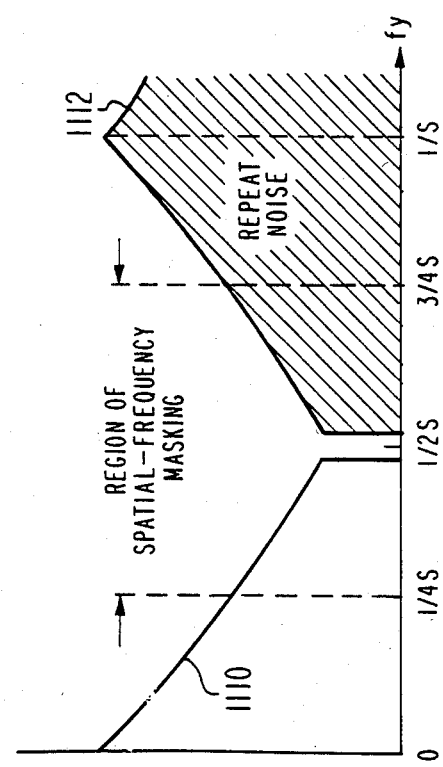
FIGS. 11a–b illustrates a spatial-frequency plot aiding in the understanding of adjacent-band masking.
Figure 11B:
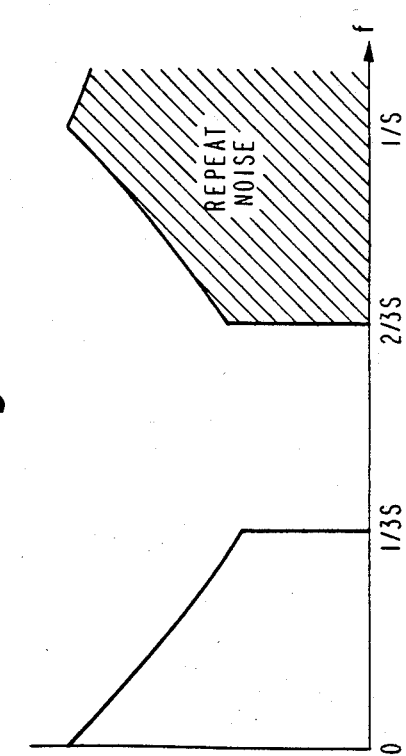

It has been mentioned that the process of filtering out spatial frequencies near $\pm\frac{1}{2}S$ unavoidably results in attenuation of desired signal components because of the characteristics of the spatial-frequency filters. While undesirable, this does not result in as much degradation of the image as might be expected. This is because of the psychovisual phenomenon termed "adjacent-band spatial-frequency masking". This phenomenon results in masking of spatial-frequency information by other spatial-frequency information occupying the same region of the image when the spatial frequencies of the two informations are within a spatial octave (2:1 in spatial frequency) from each other. FIG. 11a illustrates this principle. In the FIGURE, the desired signal spatial-frequency-spectrum is illustrated by an envelope 1110 extending from fy=0 almost to fy=½S. The repeat or noise spectrum centered on 1/S arising from the raster scanning or sampling at a spacing of S is the shaded region under envelope 1112. Those signal components lying near ½S are masked by noise components near ½S, and those signal components extending from ⅛S to ½S are also masked by the noise components near ½S, with the masking being greater for those signal components near ½S because they are masked by noise components as far away as 1/S. Similarly, the noise components from near 1/S to ⅜S are masked by the signal components. The region of displayed vertical spatial frequencies from ⅛S to ⅜S is therefore reduced in visibility. The display of FIG. 11b which contains no signal within range fy=⅛S to ⅜S therefore not only does not appear to be worse than the display of FIG. 11a, but display of a spectrum limited as in FIG. 11b may actually appear better than a display of FIG. 11a, because there are signal frequencies in the range of ⅛S to ½S which are not masked. This result is important in indicating that there will be little difference in appearance between displays of a progressively-scanned scene when the interpolating filters attenuate signal in the region beyond ⅛S. However, the filters of FIG. 10 attenuate the spatial-frequency spectrum over a greater range than is required by the "adjacent band masking" phenomenon, in that 6 dB attenuation occurs at about ⅛S.

Figure 12:
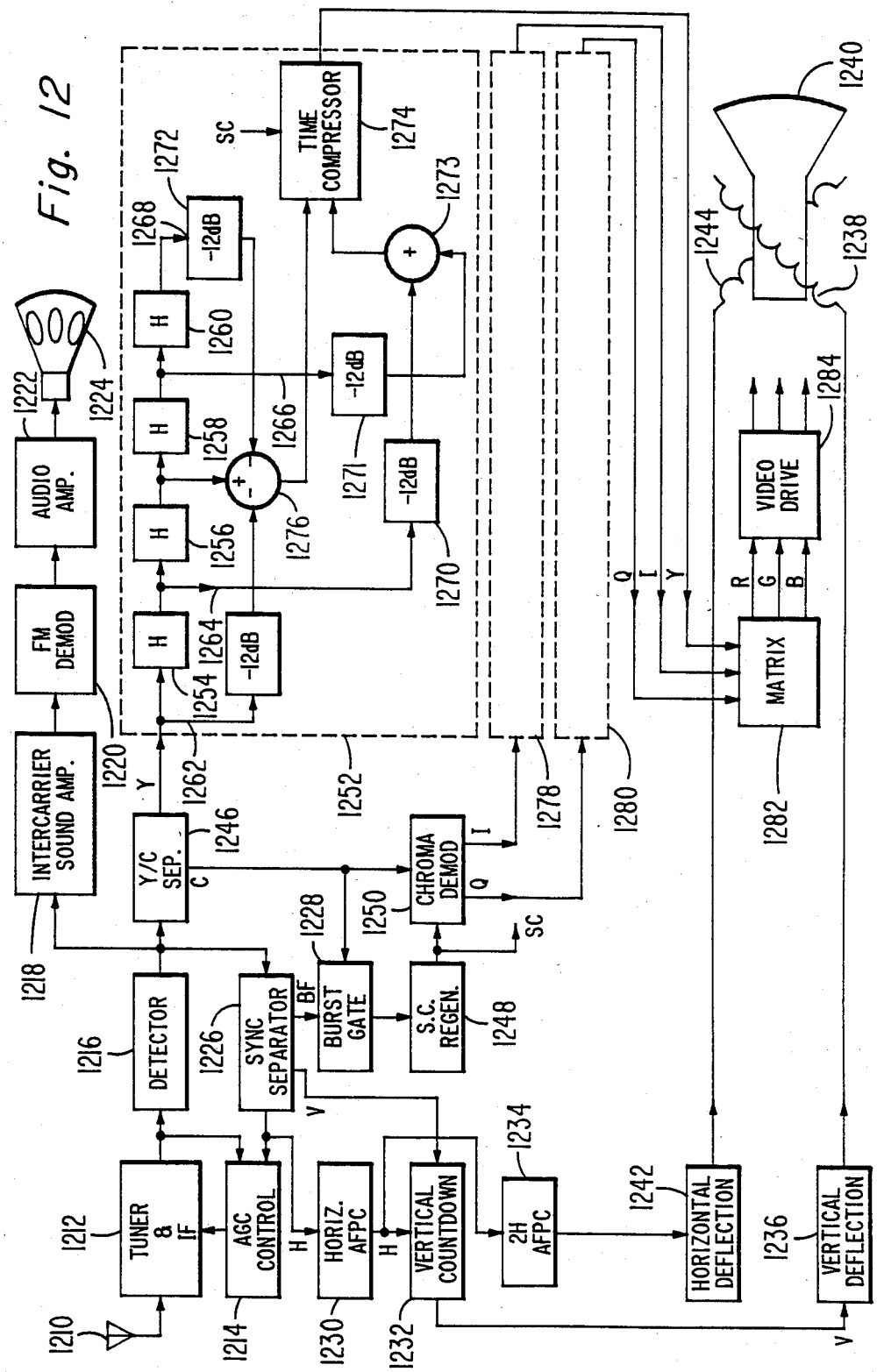
FIG. 12 is a block diagram of a television receiver having a progressively-scanned display in accordance with an aspect of the inventions.

FIG. 12 illustrates a receiver for interlaced television signals which produces a progressively-scanned image by use of an interpolating filter having a response such as that illustrated in FIG. 9. In FIG. 12, standard broadcast NTSC signals modulated on a carrier are received by an antenna 1210 which are applied to a tuner and IF amplifier illustrated together as a block 1212 in which they are down converted to an intermediate frequency (IF). The IF signals are applied to an AGC control circuit illustrated as block 1214 for controlling the gain of the tuner and IF amplifier. The IF signals are also applied to a second detector 1216 which demodulates the signal to baseband as a composite color television signal. The 4.5 MHz intercarrier sound component of the signal is applied to an audio channel including an intercarrier sound amplifier 1218, an FM demodulator 1220, an audio amplifier 1222, and a loudspeaker illustrated as 1224. The baseband composite signal from detector 1216 is also applied to a sync separator 1226 which separates the vertical and horizontal sync signals therefrom and which also generates a burst flag 1226 which is applied to a burst gate 1228. The horizontal scanning signals are applied to a horizontal-frequency automatic-frequency and phase-control (AFPC) circuit illustrated as block 1230 which generates stabilized horizontal sync signals for application to a vertical count-down circuit 1232, as known in the art, and also for application to twice-horizontal-frequency AFPC circuit 1234 which generates timing signals for the double-frequency generation of the progressively scanned display. The signals from the vertical count-down circuit circuit 1232 are applied to a vertical deflection circuit 1236 which drives a vertical deflection winding associated with a display tube 1240. The double-rate horizontal signals for AFPC 1234 are applied to a horizontal deflection circuit 1242 which produces horizontal deflection drive for a horizontal deflection winding 1244 also associated with tube 1240.

The composite video signal for 1216 is applied to a luma/chroma separator 1246 which separates the luminance from the chrominance component. The chrominance component is applied to burst gate 1228 which couples the burst portion of the burst signals to a subcarrier generator 1248 for regenerating the subcarrier. The regenerated subcarrier is applied to a chroma demodulator 1250 for synchronous demodulation of the chroma I and Q signals to baseband.

The luminance signals for Y/C separator 1246 are applied to an interpolation-filter-compressor 1252 having a response equivalent to 910 and which includes a cascade of four delay lines 1254–1260 each of which has a delay of approximately 63.5 $\mu S$, the duration of a standard horizontal line in the NTSC system. Taps 1262–1268 associated with delays 1254–1260 couple samples of the delayed luminance signal to a plurality of individual 12 db attenuators illustrated as blocks 1969–1272.

Twelve db corresponds to an amplitude ratio of 1:4, and therefore the luminance samples at the output of attenuator 1270 are reduced to ¼ of the input amplitude. This ratio corresponds to the value p=¼ illustrated in FIG. 9. The outputs of attenuators 1270 and 1272 are applied to an adder 1273 to form an interpolated signal which is applied to an input of a time compressor 1274. A second input to time compressor 1274 is taken from the output a summer 1276 which receives signal at its inverting inputs terminals from attenuators 1269 and 1272 and at its noninverting input terminal from the output of delay line 1256. The signal coupled from delay line 1256 to the noninverting input terminal of summer 1276 is not attenuated because, for a value of p=−¼, the value of the central peak of response 910 is given by (½−2p) which has a value of unity (no attenuation). Time compressor 1274 includes a plurality of delay lines accepting simultaneous parallel inputs and producing time-compressed double-frequency sequential lines. Such a time compressor is described in detail in U.S. Pat. No. 4,376,957, issued Mar. 15, 1983 to R. A. Dischert, et al.

The I an Q signals from demodulator 1250 are applied to interpolator-time-compressors 1278 and 1280, respectively, which are similar to interpolator-time-compressor 1252. The time-compressed interpolated Y, I and Q signals from 1252, 1278 and 1280 are applied to a matrix 1282 which produces R, G, and B signals which are applied to a video drive circuit 1284 for application to display tube 1240.

Figure 13A:
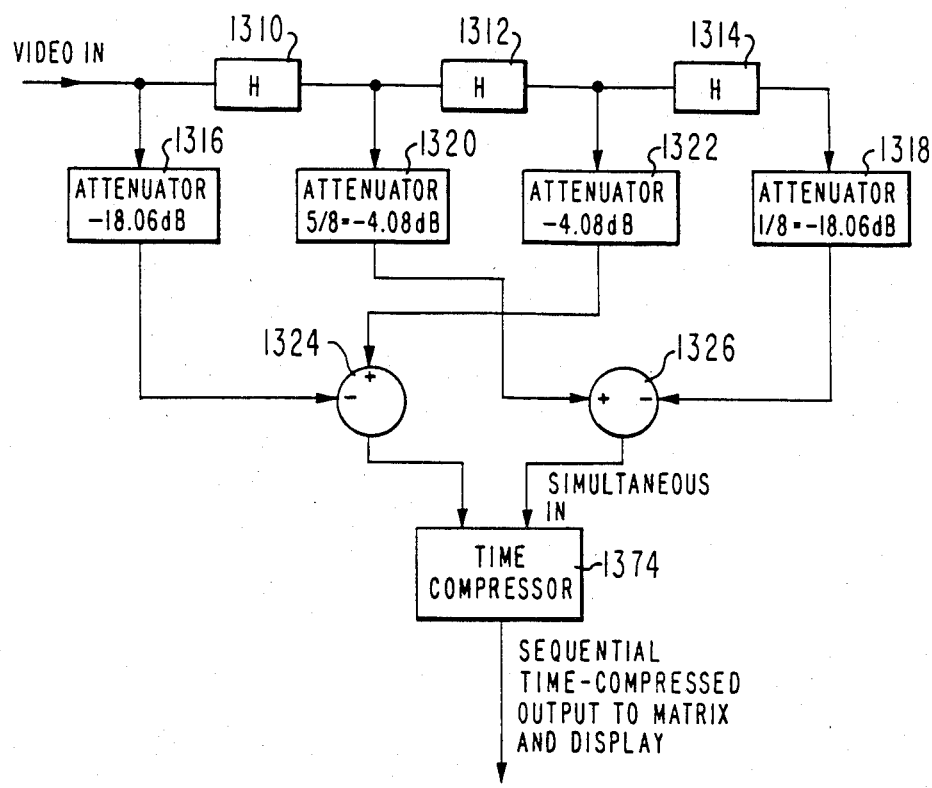
FIGS. 13a–b is a block diagram of an interpolator and time compressor which may be used in the arrangement of FIG. 12.
Figure 13B:
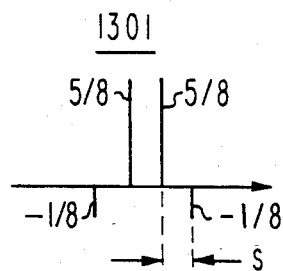

FIG. 13 is an embodiment of the invention for use as an interpolator-time-compressor in place of 1252 of FIG. 12. The arrangement of FIG. 13a has a response illustrated as 1301 of FIG. 13b and is equivalent to the filter of FIG. 8 for a value of p=−⅛. In FIG. 13, noncompressed video is applied to a cascade of H delay lines 1310–1314, each of which has a delay of approximately 62.5 $\mu S$. Attenuators 1316 and 1318 having attenuations of 18 db (corresponding to a value of p=⅛) are coupled to the input of delay line 1310 and to the output of delay line 1314. Attenuators 1320 and 1322 having attenuations of 4.08 db ((corresponding to a value of=(½−p)=⅝)) are coupled to the junctures of delay lines 1310, 1312, and 1312, 1314. The outputs of attenuators 1316 and 1322 are coupled to the inverting and noninverting inputs respectively, of a summer 1324, and similarly the outputs of attenuators 1318 and 1320 are coupled to the inverting and noninverting inputs of a summer 1326. The signals simultaneously appearing at the outputs of 1324 and 1326 are applied to the input of a time compressor 1374 which accepts the simultaneous input signals and produces a sequential time-compressed output signal which may be applied to matrix 1280 for matrixing with other video signals to produce display drive.

Figure 14:
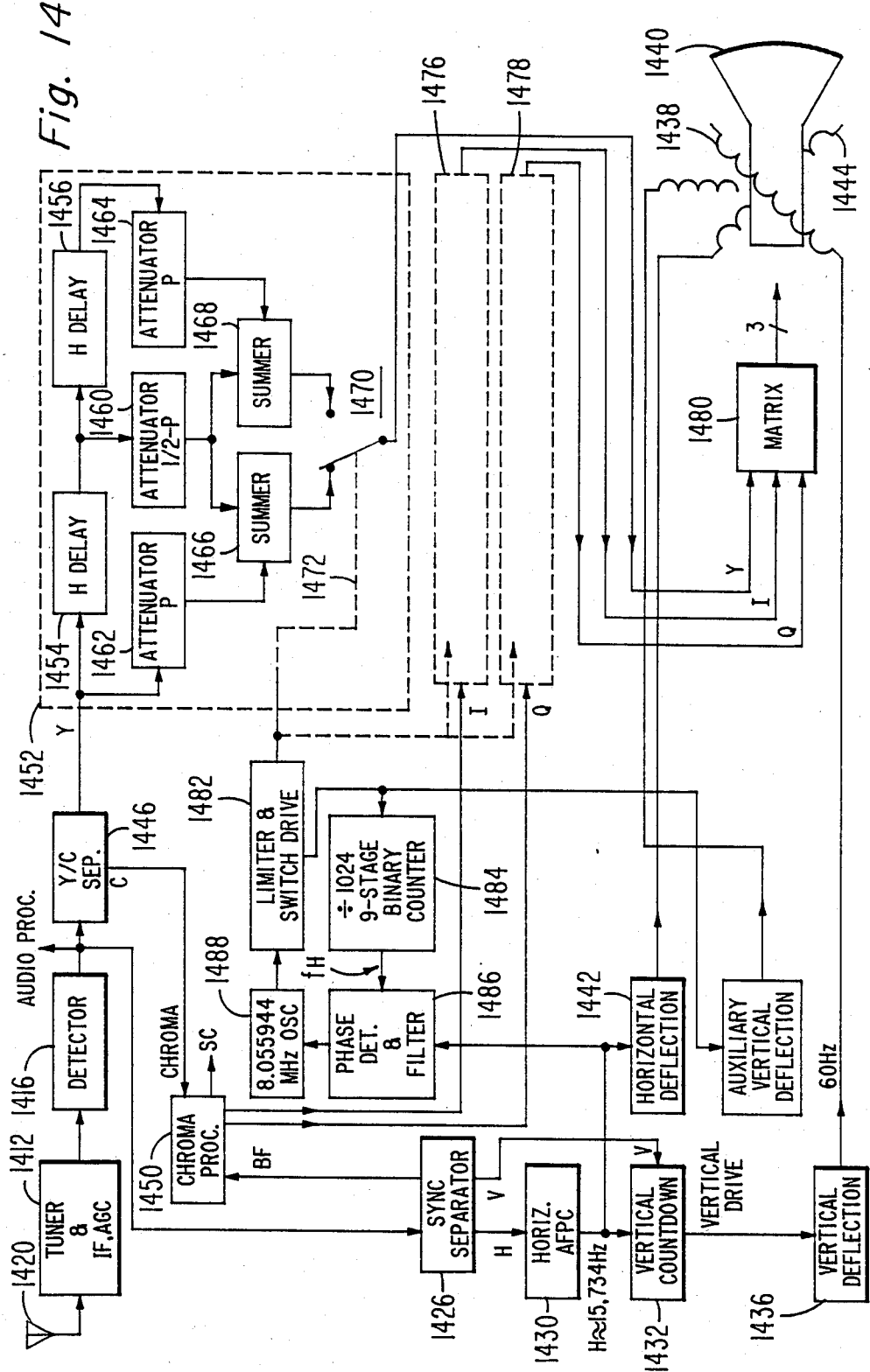
FIG. 14 is a block diagram of a television receiver which includes a switching interpolating filter according to another aspect of the invention.

FIG. 14 illustrates another embodiment of the invention which uses vertical spot-wobbling to produce a display having reduced line-crawl artifacts by generation of an effective progressively scanned display using interpolation. In FIG. 14, a tuner, IF and AGC circuit illustrated together as a block 1412 is coupled to an antenna 1420 for receiving NTSC signals modulated onto a carrier. A detector 1416 coupled to the output of the tuner block demodulates the signal to produce composite video which is applied to a sync separator 1426 and to a Y/C separator 1446. The sync separator produces a burst flag (BF) signal which is applied to chroma processor 1450 together with the chrominance signal from separator 1426. The chrominance processor produces I and Q signals. Sync separator 1426 produces horizontal synchronizing signals which are applied to an AFPC circuit 1430 which produces signals at 15,734.266 Hz for application to a vertical countdown circuit 1432 and to a horizontal deflection circuit 1442. Horizontal deflection circuit 1442 drives a horizontal deflection winding 1444 associated with a kinescope 1440. Vertical drive signals from vertical countdown circuit 1432 are applied to vertical deflection circuit 1436 which applies 60 Hz drive to a vertical deflection winding 1438.

Figure 15A:
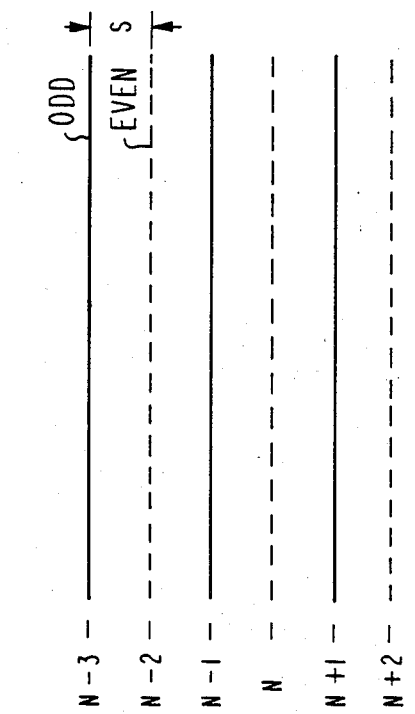
FIGS. 15a–b illustrates scanning waveforms formed by the display of the arrangement of FIG. 14.
Figure 15B:
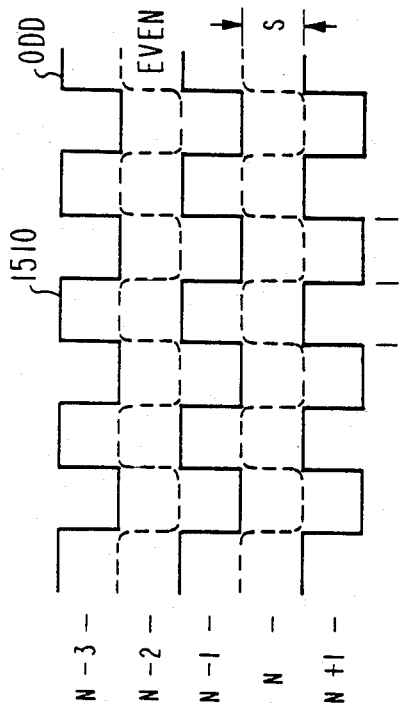

The chrominance signals from separator 1446 are applied to a filter 1452 having a response equivalent to response 1810, and which includes a cascade of two H delay lines 1454-1456. An attenuator 1460 having a value of ($\frac{1}{2}$ −p) receives an input signal from the output terminal of delay 1454. An attenuator 1462 having a value for reducing the signal to P receives signal from the input of delay 1454 and an attenuator 1464 also having an attenuator for reducing the signal to p receives signal from the output of a delay 1456. The output signals of attenuators 1462 and 1464 are applied to the input terminals of summers 1466 and 1468, respectively, together with the output signal from attenuator 1460. A switch 1470 alternately selects the output signals of summers 1466 and 1468 under the control of a limiter and switch driver 1482, as suggested by dotted line 1472. The output of switch 1470 is luminance signal which is applied to matrix 1480 together with I and Q signals from I and Q filters 1476 and 1478. Switch 1470 is driven by switch drive circuit 1482 at a frequency which is an even multiple of half the horizontal deflection frequency. In the embodiment of FIG. 14, the switch drive operates at 2048 times half the line frequency, which is a frequency slightly greater than 8 MHz. A phase-lock loop (PLL) including limiter 1482, frequency divider 1484, phase detector-filter 1486 and oscillator 1488 maintains the desired switch frequency. The switch rate at an even multiple of half the line rate controls the switch so that complete switching cycles occur during each line interval, so that there is no phase progression from line to line. This is desirable in order to produce the deflection patterns illustrated in FIG. 15b. FIG. 15b illustrates a scanning pattern created by auxiliary vertical deflection at an even multiple of half the line rate. In FIG. 15b the solid lines indicate scanning by odd fields and the dotted lines represent scanning by even fields. It can be seen that the positive-direction deflection of each cycle coincides with that of the adjacent lines, so that the scanning is effectively of two lines separated by a vertical distance S for each horizontal scan. Thus the number of lines is doubled for each field. During the positive excursions of each scan, one of which is illustrated as 1510 of FIG. 15b, switch 1470 is in its leftmost position so that the output signal displayed in the interval T0-T1 is derived from the input and output of delay 1454. During the next interval, from time T1 to time T2, the 8 MHz square wave causes negative going vertical excursion of the auxiliary deflection, and switch driver 1482 simultaneously drives switch 1470 to its rightmost position (not shown) in which condition the luminance output signal from filter 1452 is the sum of a signal derived from the input and output of delay 1456. Thus, the desired display sequence is generated. The pattern of FIG. 15a illustrates conventional deflection without spot-wobble for comparison with FIG. 15b.

Figure 16:
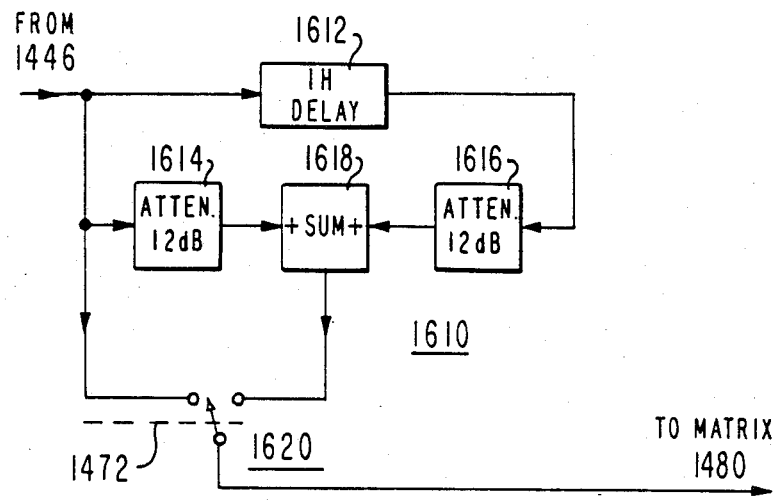
FIGS. 16 and 17 illustrate interpolating filters which may be substituted into the arrangement of FIG. 14.

FIG. 16 illustrates in block-diagram form a filter 1610 having a response corresponding to 510 of FIG. 8 (tap amplitude $\frac{1}{4}$, $\frac{1}{2}$, $\frac{1}{4}$), which may be substituted for filter 1452 (or 1476, 1478) in FIG. 14. The signal applied to filter 1610 is applied to a 1H delay line 1612, by way of a 12 dB attenuator 1614 to a first input terminal of a summer 1618, and to a terminal of a switch 1620. Switch 1620 is controlled at a nominal 8 MHz rate by switch control 1472, as described in conjunction with FIG. 14. The output of delay line 1612 is applied by way of a 12 dB attenuator 1616 to a second input terminal of summer 1618. The output signal from summer 1618 is applied to a second terminal of switch 1620. The switched luminance output signal is applied to matrix 1480 for display as described previously.

Figure 17:
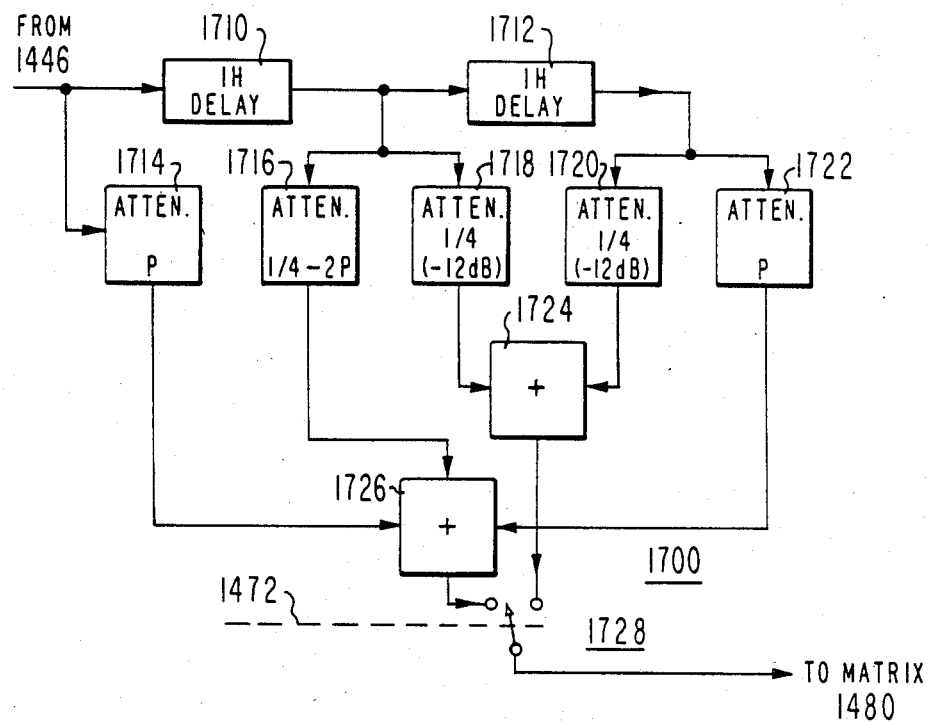

FIG. 17 illustrates a filter 1700 having a response corresponding to 910 of FIG. 9, which filter may be substituted for filter 1452 (1476, 1478) of FIG. 14. In FIG. 17, the input signal is applied to a cascade of 1H delay lines 1710, 1712 and by way of an attenuator 1714 having a value p to an input terminal of a summer 1726. The signal delayed by delay line 1710 is applied by way of an attenuator 1716 of value ($\frac{1}{2}$ −2p) to a second input terminal of summer 1726 by way of an attenuator 1718 of value 12 dB to a noninverting input terminal of a summer 1724. The signal at the output of delay line 1712 is applied by way of an attenuator 1720 of value −12 dB to a second input terminal of summer 1724 and by way of an attenuator 1722 having a value p to an input terminal of summer 1726. The output terminals of summers 1724 and 1726 are applied to the terminals of a switch 1728 which selects either (a) the sum of two mutually 1H delayed −12 dB signals, or (b) the vector sum of (i) a relatively 1H delayed signal attenuated to ($\frac{1}{2}$ −2p) and (ii) two signals, one relatively undelayed and the other 2H delayed, attenuated to a value p. The value p may be negative, in which event inverting inputs of summer 1726 may be used. The switched signal from switch 1728 is applied to a matrix, as described previously.

Figure 18:
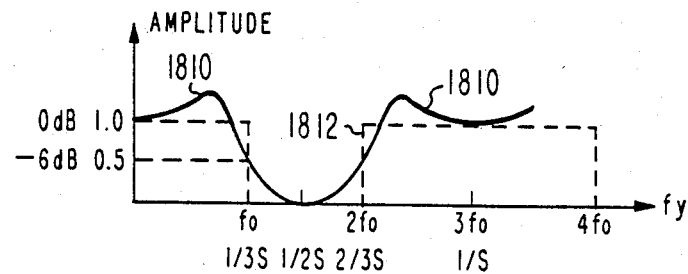
FIG. 18 illustrates the spatial-frequency response of an ideal filter and of a filter according to the invention.
Figure 19:
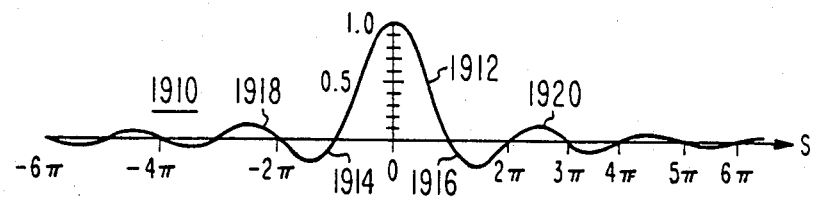
FIG. 19 illustrates a portion of a sin x/x distribution representing a filter response.
Figure 20:
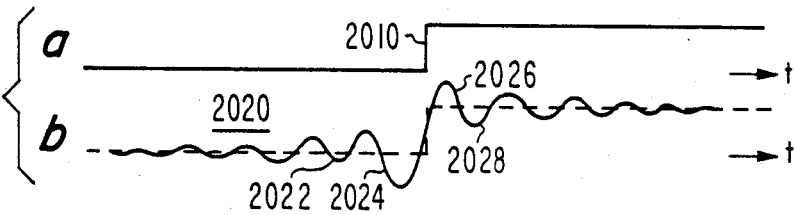
FIG. 20a–b illustrates a waveform and the result of convolving the waveform with the response of FIG. 19.

As mentioned in conjunction with FIG. 11, the apparent quality of a sampled image can be improved by eliminating those image and repeat signal components which are affected by adjacent-band masking, which are those components within a spatial octave of each other. FIG. 18 illustrates the spatial-frequency spectrum 1810 of a filter which has a half-amplitude response (−6 dB) at $\frac{1}{3}$S and at $\frac{2}{3}$S, which are in a frequency ratio of 2:1. The amplitude of the filter response at ½S is zero, so that line crawl is eliminated. It might be thought that by adding taps and therefore adding sections to the filter to obtain a squared-off response, such as that illustrated by dotted line 1812, that an improved image can be displayed. The response of a filter having an infinite cutoff rate follows a sin x/x distribution, as illustrated by the curve designated generally as 1910 in FIG. 19. Curve 1910 includes a main lobe 1972, a negative first sidelobe 1914 and a positive first sidelobe 1916, positive and negative second sidelobes 1918, 1920, etc. Curve 1910 extends to the left and to the right to S=±00. When convolved with a signal, response 1910 produces pre- and post-ringing. For example, when response 1910 is convolved with a step-function signal such as 2010 of FIG. 20, the filtered signal illustrated as 2020 has a very rapid risetime but includes pre- and post-ringing peaks including 2022–2036. Thus, while a rapid response results, large peaks of ringing distort the image signal.

Figure 22:
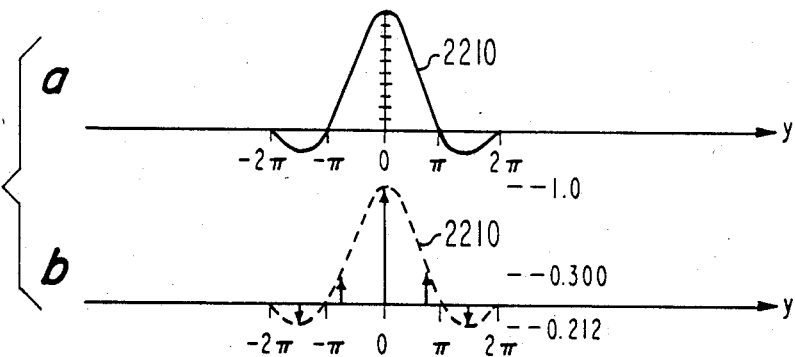
FIGS. 22a–b illustrates a sin x/x distribution truncated in the spatial direction and its relation to a filter according to the invention for giving a response such as that of FIG. 21.
Figure 21:
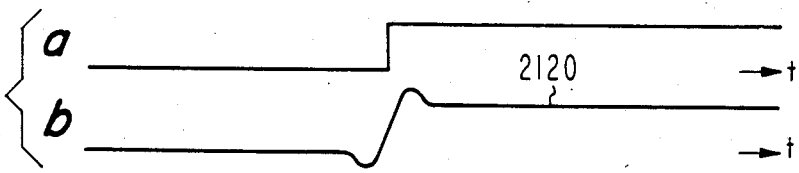
FIGS. 21a–b illustrates a step-function signal and one desirable form of response to a filter.

The eye is very sensitive to such ringing. Generally speaking, if the ringing is damped or otherwise limited to a single preshoot and a single overshoot, as illustrated by response 2120 in FIG. 21b, the image will subjectively appear better than that of FIG. 20 even though the rate of change of the step transition in 2120 is not as great as in 2020. Such a ringing pattern results when the sin x/x distribution which describes the filter amplitude responses vs. vertical distance is truncated. The truncated sin x/x distribution (2110 of FIG. 22a) may be used to describe the envelope of the multipliers associated with the taps of a filter, while the tap spacing is established by the vertical distance S, as illustrated by the tap spacings and amplitudes of FIG. 22b for which S is equivalent to 3π/4. It will be noted that the tap weights illustrated in FIG. 22b do not add to exactly unity. In filters according to one aspect of the invention, it may be desirable to adjust the weights away from true sin x/x values in order to compensate for the effects of truncations on the zero amplitude at ½S and the unity value at 1/S=0. It has been found that there is little difference between a five-tap and seven-tap response. In order to have only single pre- and post-rings, it appears to be necessary to have the tap weights decreased monotonically over the principal lobe and follow the curve for at least part of but not more than the first sidelobe. If more sidelobes are included, the response tends to ring in a manner which causes ringing artifacts in the amplitude in the image thus creating light and dark regions about a transition. Thus interpolating filters in accordance with an aspect of the invention provide subjective improvements by selecting the tap multipliers to be similar to a truncated sin x/x distribution, and by having the filter cutoff selected to attenuate the adjacent-band region from fy=½S to ⅔S. While the exact degree of attenuation at fy=½S and at fy−⅔S for best performance is a subjective determination, 6 dB of attenuation relative to a flat response seems to be adequate.

Other embodiments of the invention will be obvious to those skilled in the art. For example, the circuits may be digital, as for example using digital stores or memories rather than delay lines as described in the embodiments. The displays may be video monitors rather than full-fledged receivers incorporating tuner, IF amplifier, etc. Various filter responses may be used within the scope of the invention.

The chrominance channels may use interpolating filters which are different from that used in the luminance channel, i.e. p=0 since the spatial frequency response of the eye for chrominance information is less that that for luminance, as evidenced by the lesser bandwidth of the I and Q color television signals relative to Y. A simplification of the required circuitry may be achieved in this manner.

What is claimed is:

1. An interpolator for generating scan lines for progressive display from a television signal representing an image scanned by a raster consisting of scan lines separated by a distance 2S, time-alternately interlaced with a second raster of scan lines also separated by 2S, comprising:
   means for sampling the signal with a plurality of taps separated in spatial frequency by S;
   multiplying means coupled to each of said taps for, at each tap multiplying the signal intercepted by said tap by a constant, which constant may be zero;
   summing means coupled to said multiplying means having a non-zero value for summing the outputs thereof in such a manner as to form a pair of filtered video output signals for display alternately in progressive scan fashion, said summing means summing said outputs of said multiplying means so as to attenuate to zero those signal components of each output at a vertical spatial frequency of ±½S and so as to amplify to an amplitude greater than the zero-spatial-frequency signal component at least some of the signal components lying between the vertical spatial frequency of zero and ±½S while maintaining the same image phase in the region of vertical spatial frequencies between zero and ±1/S.

2. A television system for use with line-scan television signals representing an image raster-scanned by interlaced fields, comprising:
   a source for providing said television signals;
   first delaying means coupled to said source of signals for delaying said signals by a first delay equal to a first even multiple of one-half of the time duration of a raster scan line at the point of said delay;
   second delaying means coupled to said source of signals for delaying said signals by a second delay equal to a second even multiple of one-half of the time duration of a raster scan line at the point of said delay;
   first signal sampling means coupled to said first delaying means for sampling said signals for producing a set of at least first and second signals mutually delayed by said first delay of said first delaying means;
   second signal sampling means coupled to said second delaying means for producing a set of at least third and fourth signals mutually delayed by said second delay of said second delaying means, so one of said set of first and second signals and said set of third and fourth signals are delayed relative to the other of said sets by a delay equal in duration to said one-half of the time duration of a raster scan line;
   first and second weighting means coupled to said first and second sampling means, respectively, for weighting said signals of said first set and of said second set, respectively to form first and second sets of weighted signals;
   first and second summing means coupled to said first and second weighting means respectively, for summing together the weighted first and second, and third and fourth signals, respectively, to form lines of signal for display; and display means coupled to said first and second summing means for displaying an image for presenting in alternating sequence signals derived from said first and second summing means.

3. A system according to claim 2 wherein said first delaying means comprises cascaded first and second delay lines each having a delay equal to the duration of one-half of a raster line scan at the point of said delay, said second delaying means comprises a third delay line having delay equal to the duration of one-half of a raster line scan at the point of said delay, said third delay line being cascaded with said second delay line;

said first signal sampling means comprises taps at the input of said first delay line and at the output of said second delay line, and further comprises first controllable switch path coupled to said taps;

said second signal sampling means comprises taps coupled to the outputs of said first and third delay lines;

said first and second weighting means comprise individual attenuators coupled to said taps, and further comprises second controllable switch paths coupled to said taps;

said display means comprises a display having controllable auxilliary vertical deflection means, and control means coupled to said first and second controllable switch paths and to said auxiliary deflection means for operating said switches and for deflecting said display vertically at a rate which is high relative to the vertical and horizontal deflection rates for producing an enhanced display with reduced artifacts.

4. An interpolating filter for generating interstitial lines of a television signal representing an image scanned by a raster consisting of scan lines separated by a distance 2S, time-alternately interlaced with a second raster of scan lines also separated by 2S, comprising:

means for sampling the signal with a plurality of taps separated in space by S;

multiplying means coupled to each of said taps for multiplying the signal intercepted by each said tap by a constant, which constants are selected to fit a truncated sin x/x distribution; said constants being additionally selected to differ from true sin x/x values to minimize ringing effects due to said truncation; and summing means coupled to said multiplying means for summing the outputs thereof in such a manner as to attenuate to substantially zero those signal components at a vertical spatial frequency of $\pm\frac{1}{2}S$.

5. A filter according to claim 4 wherein said sin x/x distribution is truncated beyond the second positive and negative zeros so that said constants fit the main lobe and the positive and negative first sidelobes of said sin x/x distribution.

6. A filter according to claim 4 wherein said plurality of taps equals five.

7. A filter according to claim 4 wherein said plurality of taps equals seven.

8. A filter according to claim 4 wherein said plurality of taps is one of five and seven, and the response of said filter attenuates signals at vertical spatial frequencies between $\frac{1}{8}S$ and $\frac{3}{8}S$ by an amount greater than 6 dB for improving the apparent equality of the picture by elimination of adjacent-band masking.

9. A filter according to claim 4 wherein the magnitude of said multiplier decreases monotonically away from the central tap over the principal lobe of a sin x/x distribution.

10. A television apparatus including an interpolating filter for generating lines of television video for progressively-scanned display from lines of video representing an image scanned by a raster during recurrent first and second fields, said lines of video of said first and second fields being mutually interlaced, the apparatus comprising:

tapped delay means coupled to the source of said video signal for temporally offsetting the video appearing at the taps relative to the video appearing at the other taps by integer multiples of the duration of one line scan of said video to produce a first plurality of delayed video signal samples;

multiplying means coupled to said taps for controlling the amplitude of said delayed video signals in a predetermined manner to produce multiplexed signal samples equal in number to said first plurality;

a second plurality of summing means, said second plurality being equal to the sum of one plus the number of lines to be interpolated between each pair of lines of each incoming field, each of said plurality of summing means being coupled to a different set of said multiplied signal samples for simultaneously generating lines of interpolation-filtered video signals, the lines of said interpolation-filtered video signals being generated at any time being equal in number to said second plurality;

parallel-to-serial conversion means coupled to said summing means for changing the form of said interpolation-filtered video signals from simultaneous to time-sequential according to a predetermined time sequence to form time-sequential interpolation-filtered video signals; and display means coupled to said parallel-to-serial conversion means for displaying said time-sequential interpolation-filtered video signals in a vertical position sequence corresponding with said time sequence.

11. An apparatus according to claim 10 wherein said tapped delay means comprises a cascade of a plurality of delay lines.

12. An apparatus according to claim 11 wherein said delay lines are CCD delay lines.

13. An apparatus according to claim 11 wherein said delay lines are digital memories.

14. An apparatus according to claim 10 wherein said multiplying means comprises attenuating means.

15. An apparatus according to claim 14 wherein the multiplying factor may be unity for a plurality of said delayed video signals less than said first plurality; whereupon that portion of said multiplying means acting with unity multiplier merely comprises conducting means.

16. An apparartus according to claim 10 wherein
said tapped delay line has one 1H delay producing a relatively undelayed video signal and a relatively 1H delayed signal, said multiplying means comprises a unity-gain and a 6 dB attenuation of said undelayed signal to produce an unattenuated undelayed signal and a −6 dB undelayed signal, and said multiplying means also comprises a 12 dB attenuation of said 1H delayed signal;

said summing means comprises a summer coupled to add said 6 dB attenuated undelayed signal with said 12 dB attenuated 1H delayed signal to produce a sum signal at a first output terminal of said summing means, and said summing means also comprises a conductor coupled to receive said unattenuated undelayed signal and to conduct said unattenuated undelayed signal to a second output terminal of said summing means.

17. An apparatus according to claim 16 wherein said parallel-to-serial conversion means comprises switching means coupled to switch at high speed sequentially between the signals at said first and second outputs of said summing means.

18. An apparatus according to claim 10 wherein said summing means comprises inverting input terminals.

19. An apparatus according to claim 10 wherein said second plurality of summing means comprises a third plurality less than said second plurality of summers coupled to receive a set of only one multiplied signal sample, whereupon said summers coupled to receive a set of only one multiplied signal sample merely comprises conductive means.

20. An apparatus according to claim 10 wherein said parallel-to-serial conversion means comprises time-compressing means for generating sequential time-compressed double line-rate signals.

21. An apparatus according to claim 10 wherein said parallel-to-serial conversion means comprises switching emans coupled to switch at high speed sequentially among said interpolation-filtered video signals without changing the line rate.

22. An apparatus according to claim 20 wherein said display means comprises a display scanned at said double line rate.

23. An apparatus according to claim 21 wherein said display means comprises deflection means for fully deflecting the scan of said display vertically at a rate less than the line rate and also comprises auxiliary vertical deflection means for deflecting the scan by a relatively small amount at said high speed.

24. An arrangement according to claim 10 wherein:
said tapped delay means comprises a cascade of first and second 1H delays, and also comprising taps at the input and output of said first delay and at the output of said second delay to form an undelayed video sample, a 1H delayed video sample and a 2H delayed video sample;
said multiplying means comprises first and second attenuators for alternating the signals to a value p, where p is a predetermined fraction, said first attenuator being coupled to receive said undelayed video sample to produce a p-attenuated undelayed video signal, and said second attenuator being coupled to receive said 2H delayed sample for producing a p-attenuated 2H-delayed video signal, said multiplying means further comprising third and fourth attenuators for attenuating signals to a value $\frac{1}{4}$, said third attenuator being coupled to receive said 1H delayed video sample for generating a $-12$ dB 2H-delayed video signal, said multiplying means further comprising a fifth attenuator for attenuating to a value ($\frac{1}{4}$-2P), said fifth attenuator being coupled to receive said 1H delayed video sample for producing a main attenuated 1H delayed video signal;
said summing means comprises a first summer coupled to said third and fourth attenuators for receiving said $-12$ dB 1H-delayed and $-12$ dB 2H delayed video samples for producing a first such video signal, and said summing means also comprises a second manner coupled to receive said p-attenuated undelayed video signal, said main attenuated 1H-delayed video signal and said p-attenuated 2H-delayed video signal for generating a second sum video signal.

25. An apparatus according to claim 24 wherein said p-attenuated undelayed and 2H-delayed video signals are applied to inverting input terminals of said second summer.

26. A television arrangement for producing a progressively-scanned display from line signals representing an image scanned by a raster having lines of even fields separated vertically be a distance 2S interlaced with lines of odd fields having positions separated from the lines of said even fields by a distance S, comprising:
filtering means for spatial-frequency filtering said signals in a vertical direction with a filter producing an output signal for each incremental distance S, thereby simultaneously producing first and second filtered lines of signal for each line of incoming signal;
circuit means coupled to said filtering means for time compressing and interleaving said first and second filtered lines of signal; and
display means coupled to said circuit means for displaying said time compressed and interleaved first and second filtered lines of signal in progressive scan fashion on adjacent display raster lines.

27. A color television apparatus adapted for receiving television signals representative of an interlaced raster and for display by progressive scanning, comprising:
luminance sampling means coupled to receive a luminance component of said television signals for sampling the signal with a plurality of luminance taps separated in spatial frequency by 1/S where S is the distance between raster lines of one field and spatially adjacent raster lines of a temporally adjacent field;
luminance multiplying means coupled to each of said luminance taps for multiplying by a constant the signal intercepted by said luminance taps;
luminance summing means coupled to said luminance multiplying means for summing the outputs thereof in such a manner as to attenuate to zero those signal components at a vertical spatial frequency of $\pm\frac{1}{2}S$;
chrominance sampling means coupled to receive a color-representative component of said television signals for sampling the signal with a plurality of chrominance taps separated in spatial frequency by 1/S;
chrominance multiplying means coupled to each of said chrominance taps for multiplying by a constant the signal intercepted by said chrominance taps; and
chrominance summing means coupled to said chrominance multiplying means for summing the outputs thereof in such a manner as to attenuate to zero those signal components at a vertical spatial frequency of $\pm\frac{1}{2}S$;
and wherein at least one of said plurality of chrominance taps different from said plurality of luminance taps and said constant constants by which the signal intercepted by said luminance taps are multiplied, whereby said luminance and chrominance filters have differing characteristics.

* * * * *

UNITED STATES PATENT AND TRADEMARK OFFICE
CERTIFICATE OF CORRECTION

PATENT NO. : 4,602,273                           Page 1 of 2

DATED     : 7-22-86

INVENTOR(S): Curtis R. Carlson

It is certified that error appears in the above-identified patent and that said Letters Patent is hereby corrected as shown below:

At Col. 9, lines 15, 17:

"$\frac{3}{4}S$" should be ---3/4S---.

At Col. 9, line 19;
   Col. 12, line 68;
   Col. 15, line 66:

"$\frac{2}{3}S$" should be ---2/3S---.

At Col. 9, lines 19, 23, 27;
   Col. 12, line 68;
   Col. 13, lines 56, 57;
   Col. 15, line 66:

"$\frac{1}{3}S$" should be ---1/3S---.

At Col. 6, lines 10, 12;
   Col. 7, line 61;
   Col. 8, lines 54, 55;
   Col. 9, lines 9, 10, 17, 23, 31:

"$\frac{1}{4}S$" should be ---1/4S---.

UNITED STATES PATENT AND TRADEMARK OFFICE
CERTIFICATE OF CORRECTION

PATENT NO. : 4,602,273                                    Page 2 of 2

DATED      : 7-22-86

INVENTOR(S): Curtis R. Carlson

It is certified that error appears in the above-identified patent and that said Letters Patent is hereby corrected as shown below:

At Col. 3, lines 4, 5, 18;
   Col. 5, line 66;
   Col. 6, lines 7, 10, 43, 46, 67;
   Col. 7, lines 1, 6, 19, 28, 40, 51, 57, 64;
   Col. 8, lines 1, 19, 22, 24, 34, 37, 39, 42;
   Col. 8, lines 43, 44, 45, 55, 59;
   Col. 9, lines 5, 9, 10, 11, 13;
   Col. 13, lines 2, 41;
   Col. 14, lines 28, 32;
   Col. 15, line 53;
   Col. 18, lines 47, 62:

"$\frac{1}{2}S$" should be ---1/2S---.

Signed and Sealed this
Fourteenth Day of October, 1986

[SEAL]

*Attest:*

DONALD J. QUIGG

*Attesting Officer*    *Commissioner of Patents and Trademarks*